United States Patent
Mizuno et al.

(10) Patent No.: US 6,531,245 B2
(45) Date of Patent: Mar. 11, 2003

(54) FUEL CELL, SEPARATOR FOR THE SAME AND METHOD FOR DISTRIBUTING GAS IN FUEL CELL

(75) Inventors: Seiji Mizuno, Toyota (JP); Tsuyoshi Takahashi, Nishikamo-gun (JP); Mikio Wada, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 31 days.

(21) Appl. No.: 09/954,178

(22) Filed: Sep. 18, 2001

(65) Prior Publication Data

US 2002/0012827 A1 Jan. 31, 2002

Related U.S. Application Data

(60) Division of application No. 09/396,220, filed on Sep. 15, 1999, which is a continuation-in-part of application No. 09/262,596, filed on Mar. 4, 1999, now abandoned.

(51) Int. Cl.[7] .................................................. H01M 2/14
(52) U.S. Cl. ...................... 429/129; 429/143; 429/147; 429/34; 429/12; 429/17; 429/30; 429/38; 429/39
(58) Field of Search ............................ 429/34, 12, 17, 429/30, 39, 38, 129, 143, 147

(56) References Cited

U.S. PATENT DOCUMENTS

| | | | |
|---|---|---|---|
| 4,542,079 A | 9/1985 | Takeuchi et al. | ............... 429/39 |
| 5,981,098 A | 11/1999 | Vitale | .......................... 429/34 |

FOREIGN PATENT DOCUMENTS

| | | | | |
|---|---|---|---|---|
| JP | 56-134473 | 10/1981 | | |
| JP | 7-263003 | 10/1995 | | |
| JP | 07263003 A | * 10/1995 | ............ | H01M/8/02 |

OTHER PUBLICATIONS

Patent Abstracts of Japan, vol. 17, No. 549, Oct. 4, 1993 & JP 05 159790 (Tokyo Gas Co Ltd), Jun. 25, 1993.
Patent Abstracts of Japan, vol. 1996, No. 2, Feb. 29, 1996 & JP 07 263003 (Mitsubushi Heavy Ind Ltd), Oct. 13, 1995.
Patent Abstracts of Japan, vol. 1995 & JP 07 029579 (Tanaka Kikinzoku Kogyo KK), Jan. 31, 1995.

* cited by examiner

*Primary Examiner*—Patrick Ryan
*Assistant Examiner*—Angela J Martin
(74) *Attorney, Agent, or Firm*—Kenyon & Kenyon

(57) ABSTRACT

Separators for unit cells of a fuel cell each have a plurality of through holes extending therethrough and a recessed portion formed in a surface thereof. In a fuel cell incorporating such separators, the recessed portion of each separator forms an in-cell oxidative gas passage, together with an adjacent cathode. An oxidative gas, supplied from an external device into the fuel cell, is distributed from an oxidative gas supply manifold formed by holes of the separators, to the in-cell oxidative gas passages. The oxidative gas is then collected in an oxidative gas discharge manifold formed by holes of the separators, and conveyed out of the fuel cell by the discharge manifold. During the passage through each in-cell oxidative gas passage, the oxidative gas flows via an oxidative gas transit manifold formed by holes of the separators.

6 Claims, 14 Drawing Sheets

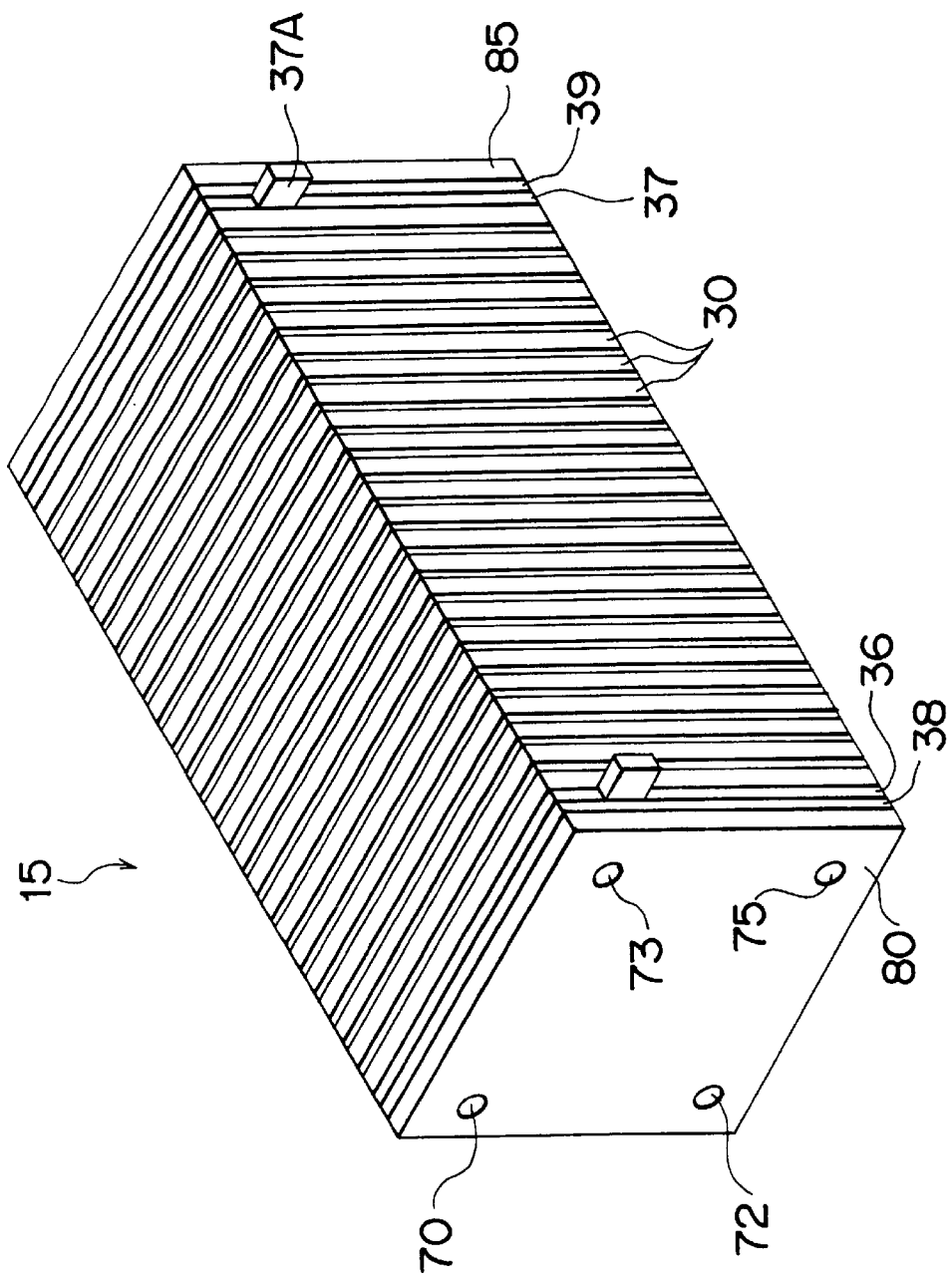

US 6,531,245 B2

FUEL CELL, SEPARATOR FOR THE SAME AND METHOD FOR DISTRIBUTING GAS IN FUEL CELL

CROSS REFERENCES TO RELATED APPLICATIONS

This is a division of application Ser. No. 09/396,220 filed Sep. 15, 1999, which is a continuation-in-part of U.S. patent application Ser. No. 09/262,596 filed Mar. 4, 1999 now abandoned.

INCORPORATION BY REFERENCE

The disclosure of Japanese Patent Application No. HEI 11-39921 filed on Feb. 18, 1999 including the specification, drawings and abstract is incorporated herein by reference in its entirety.

BACKGROUND OF THE INVENTION

1. Field of the invention

The present invention relates to a gas separator for use in a fuel cell, a fuel cell, and a method for distributing gas in a fuel cell. More particularly, the invention relates to a fuel cell separator which is provided between adjacent unit cells in a fuel cell formed of a stacked plurality of unit cells, and which forms a fuel gas passage and an oxidative gas passage, together with adjacent members and separates a fuel gas and an oxidative gas from each other, a fuel cell incorporating the separator, and a method for distributing gas in the fuel cell.

2. Description of the Related Art

A fuel cell gas separator is a member that constitutes a fuel cell stack formed of a stacked plurality of unit cells, and that has a gas impermeability sufficiently high to prevent mixture of a fuel gas and an oxidative gas that are supplied to adjacent unit cells. A typical fuel cell gas separator has a rib-like surface structure having recessed and protruding portions forming passages for the fuel gas and the oxidative gas (this type of gas separator is often termed a "ribbed inter-connector"). When incorporated in a fuel cell stack, fuel cell separators form fuel gas or oxidative gas passages (in-cell gas passages) between their rib-like surface structures and adjacent members (gas diffusion layers).

In addition to the rib-like surface structure for forming a gas passage, a typical fuel cell separator has a predetermined hole structure. If unit cells provided with such gas separators are stacked to form a fuel cell stack, the hole structures of adjacent gas separators meet so as to form gas manifolds that extend through the fuel cell stack in a stacking direction. The manifolds convey the fuel gas or the oxidative gas supplied into the fuel cell from an external device to distribute the gas to the individual unit cells, and collect a waste fuel gas or a waste oxidative gas resulting from electrochemical reactions that occur in the individual unit cells to discharge the waste gas to the outside of the fuel cell. For these functions, the gas manifolds are connected to a gas passage in each unit cell (that is, the in-cell oxidative gas passage or in-cell fuel gas passage of each unit cell), so that the gas can flow between the gas manifolds and each in-cell gas passage.

FIG. 18 illustrates the construction of a known fuel cell gas separator in a plan view. A separator 930 has a hole structure, that is, four holes 940, 942, 950, 952 formed near the periphery of the separator 930. When a plurality of unit cells, each including a separator 930, are stacked to form a fuel cell, corresponding holes of adjacent separators 930 meet so as to form four manifolds extending through the fuel cell. Specifically, these four manifolds are: an oxidative gas supply manifold for distributing the oxidative gas supplied from outside, into each in-cell oxidative gas passage; an oxidative gas discharge passage for collecting the waste oxidative gas from each in-cell oxidative gas passage and conveying the gas to the outside of the fuel cell; a fuel gas supply manifold for distributing the fuel gas supplied from outside, into each in-cell fuel gas passage; and a fuel gas discharge passage for collecting the waste fuel gas from each in-cell fuel gas passage and conveying the gas to the outside of the fuel cell.

A recessed portion 990 connecting the hole 940 and the hole 942 is formed in a surface of the separator 930 as shown in FIG. 18. The opposite surface of the separator 930 is provided with a recessed portion (not shown) connecting the hole 950 and the hole 952. Each recessed portion has a serpentine groove structure with two turns. When cell component members including separators 930 are stacked to form a fuel cell, the recessed portions of the separators 930 form, together with the members adjacent to the separators 930, in-cell gas passages. The recessed portion 990 connecting the holes 940 and 942 of each separator 930 forms an in-cell gas passage for the oxidative gas. The recessed portion connecting the holes 950 and 952 of each separator 930 forms an in-cell gas passage for the fuel gas. Therefore, the oxidative gas supplied into the fuel cell is conveyed through the oxidative gas supply manifold formed by the holes 940 of the separators 930, and distributed into the oxidative gas passage formed in each unit cell where the gas is used for the electrochemical reaction. After that, the waste gas flows out into the oxidative gas discharge manifold formed by the holes 942 of the separators 930, whereby the gas is discharged to the outside of the fuel cell. Similarly, the fuel gas supplied into the fuel cell is conveyed through the fuel gas supply manifold formed by the holes 950 of the separators 930, and distributed into the fuel gas passage formed in each unit cell, where the gas is used for the electrochemical reaction. After that, the waste gas flows out into the fuel gas discharge manifold formed by the holes 952 of the separators 930, whereby the gas is discharged to the outside of the fuel cell.

Since the recessed portion in each of the opposite surfaces of the separator 930 shown in FIG. 18 has a serpentine shape having two turns, the in-cell gas passage formed by each recessed portion has a reduced cross-sectional area in comparison with in-cell gas passages having no turns. Therefore, the gas flow velocity at a given location in each in-cell gas passage is increased, so that the gas flowing through the in-cell gas passage becomes well stirred and diffused. In such a well-stirred condition, hydrogen or oxygen in the gas (the fuel gas or the oxidative gas) is more likely to contact a catalyst layer provided on an electrode, so that the gas utilization rate in the electrochemical reactions increases.

A recessed structure formed in a surface of a fuel cell gas separator other than the recessed structure shown in FIG. 18 is proposed (in, for example, Japanese Patent Application Laid-open No. HEI 7-263003), in which a plurality of recessed portions, each having a serpentine shape with two turns as described above, are formed parallel in a surface of a separator, and gas is supplied to and discharged from the recessed portions via a gas introducing hole and a gas discharging hole that form a gas supply manifold and a gas discharge manifold.

However, in the fuel gas cell separators as illustrated in FIG. 18 or as described in the aforementioned laid-open patent application, each in-cell gas passage is provided with only one hole for introducing gas thereto (the hole 940 or 950 in FIG. 18) and only one hole for discharging gas therefrom (the hole 942 or 952 in FIG. 18), so that the flow of gas distributed to the individual unit cells of a fuel cell is likely become non-uniform or unequal. For example, water which is present as a result of the electrochemical reactions or the like may condense in a gas passage and may reside in an in-cell gas passage or near a junction between an in-cell gas passage and a gas manifold. If this happens, residing condensed water provides a resistance to gas flow, thereby impeding smooth flow of gas. If the gas supply condition deteriorates in this manner in a unit cell, sufficient progress of the electrochemical reactions in the unit cell is hindered. This may decrease the output voltage of the unit cell. In this manner, the output voltage varies among the unit cells of the entire fuel cell and, therefore, the performance of the fuel cell deteriorates.

Water condensation that may occur in a gas passage will be described. Condensation in the oxidative gas in a passage is attributed to water produced on a cathode side by an electrochemical reaction. The electrochemical reactions that occur in each unit cell of a polymer electrolyte fuel cell are shown below.

$$H_2 \rightarrow 2H^+ + 2e^- \quad (1)$$

$$1/2 O_2 + 2H^+ + 2e^- \rightarrow H_2O \quad (2)$$

$$H_2 + 1/2 O_2 \rightarrow H_2O \quad (3)$$

Equation (1) expresses a reaction that occurs at the anode in a fuel cell. Equation (2) expresses a reaction that occurs at the cathode. Equation (3) expresses a combined reaction that occurs in the entire fuel cell. As indicated above, water is produced at the cathode side as the cell reaction progresses in the polymer electrolyte fuel cell. The amount of water thus produced at the cathode side normally evaporates into the oxidative gas, and is discharged together with the oxidative gas to the outside of the fuel cell. However, if the amount of water produced is excessively large, or if a low-temperature region exits locally in the oxidative gas passage, an amount of water produced may condense and reside in the gas passage.

At the anode side, no water is produced by the electrochemical reaction. Normally, however, the fuel gas to be supplied to the anode is moisturized before being supplied to the fuel cell. Protons produced by the reaction expressed by equation (1) at the anode side hydrate with water molecules, and migrate in the form of hydrate through a solid electrolyte membrane toward the cathode side, so that a water-short condition occurs at the anode side. If the solid electrolyte dries, the electrical conductivity of the solid electrolyte decreases. Therefore, in a normal construction, the fuel gas is moisturized before being supplied to the fuel cell in order to prevent the solid electrolyte membrane from drying. In this manner, water vapor added to the fuel gas may condense in a fuel gas passage as described above. If water condenses and resides in an oxidative gas passage or a fuel gas passage so that the gas supply condition in some unit cells deteriorates as described above, the performance of the entire fuel cell may deteriorate.

The problem of variation in the output voltage among the unit cells of a fuel cell may be caused not only by the aforementioned water condensation, but also by a low precision in forming the fuel cell gas separators. If the forming precision of the recessed structure in a surface of a separator is low, that is, if there are variations in the depth of the recessed portions of the separators, the flow resistance to gas flow through in-cell gas passages varies among the unit cells, so that the amount of gas supplied varies among the unit cells. Therefore, if such low-precision separators are used in a fuel cell, the low forming precision of the separators causes variation in the output voltage among the unit cells, so that the performance of the entire fuel cell may deteriorate.

SUMMARY OF THE INVENTION

Accordingly, it is an object of the present invention to solve the aforementioned problems, that is, to prevent a reduction in the cell performance caused by non-uniform gas flow rates in the unit cells.

To achieve the aforementioned and other objects, one aspect of the invention provides a fuel cell formed of a stack of a plurality of unit cells. The fuel cell includes a gas passage provided in each unit cell, the gas passage conveying a gas to substantially the entire unit cell, a gas supply manifold that distributes the gas supplied to the fuel cell to gas passages of each unit cell, a gas discharge manifold that collects the gas from the gas passage of each unit cell and conveys the gas to outside the fuel cell, and a gas transit manifold extending in a unit cell-stacking direction and intersecting the gas passage of each unit cell, the gas transit manifold connecting the gas passages of the unit cells in communication.

Another aspect of the invention provides a method for distributing a gas in a fuel cell formed by stacking a plurality of unit cells. The method includes the steps of: distributing a supply of the gas to an in-cell gas passage formed in each unit cell, via a supply manifold formed in the fuel cell; causing an amount of the gas distributed to each in-cell gas passage to flow through the in-cell gas passage; causing at least a portion of the amount of the gas distributed to each in-cell gas passage to flow via a transit manifold which extends in a unit cell-stacking direction and which intersects each in-cell gas passage; causing the gas to flow out of each in-cell gas passage; and causing the gas from each unit cell to gather in a gas discharge manifold formed in the fuel cell and to flow out of the fuel cell.

In the fuel cell and the gas distributing method of the invention, the gas flows via the transit manifold when flowing through each in-cell gas passage. Therefore, if any unit cell of the fuel cell undergoes deterioration of the gas supply condition and therefore a reduction in the output voltage, the invention is able to prevent deterioration of the performance of the entire fuel cell. More specifically, if the passage resistance to the inflow of the gas into the in-cell gas passage of a unit cell increases due to, for example, condensed water residing therein or the like, so that the gas supply condition deteriorates, a sufficient amount of the gas can be supplied into a downstream-side in-cell gas passage because the flow of the gas from the upstream-side in-cell gas passage is supplemented when the gas flows in the transit manifold between the upstream and downstream-side in-cell gas passages. Therefore, even if condensed water resides in a unit cell, deterioration of the gas supply condition does not prevail in the entire unit cell.

Furthermore, in the fuel cell and the gas distributing method of the invention, since the gas flows via the transit manifold when flowing through each in-cell gas passage, the gas flow rates in the in-cell gas passages of the entire fuel cell can be substantially equalized. Since the in-cell gas passages communicate with one another via the transit manifold and the flows of the gas from the in-cell gas passages merge in the transit manifold, the gas flow rates become substantially equalized in the transit manifold even if the gas flow rates in in-cell gas passages upstream of the transit manifold significantly vary. In a typical fuel cell, the gas flow rates in the in-cell gas passages exhibit a predetermined gradient in the direction of the flow of the gas supplied from the outside and discharged to the outside (the direction of the flow of the gas in the gas discharge manifold). However, if the gas flow rates in the in-cell gas passages in the unit cells are substantially equalized as described above, the aforementioned gradient decreases so that each unit cell of the fuel cell receives the gas at a sufficiently high gas flow rate. Therefore, a high rate of the electrochemical reaction in each cell can be maintained.

According to the invention, the transit manifold may be provided in a plural number. Provision of a plurality of transit manifolds reduces the influence of hindrance of gas supply in a unit cell caused by water condensation or the like, and further equalizes the gas flow rates in the in-cell gas passages.

A still another aspect of the invention provides a separator for use in a fuel cell formed by stacking a plurality of unit cells. The separator includes at least a first hole portion, a second hole portion and a third hole portion for each forming a portion of a gas manifold of the fuel cell, the first hole portion, the second hole portion and the third hole portion including a first hole, a second hole and a third hole, respectively, which extend through a thickness of the separator, and a recessed portion for forming a gas passage, the recessed portion extending in a surface of the separator between the first hole and the second hole, via at least the third hole.

The separator of the invention makes it possible to form a fuel cell as described above. That is, the use of separators as described above makes it possible to form a fuel cell that has a reduced danger that the gas supply condition may deteriorate in a unit cell so as to reduce the output voltage of the unit cell and reduce the performance of the entire fuel cell. Furthermore, the use of separators as described above makes it possible to form a fuel cell which substantially equalizes the gas flow rates in the in-cell gas passages of the fuel cell and which secures a sufficiently high gas flow rate in each unit cell so that a high level of the electrochemical reaction in each cell can be maintained.

The recessed portion formed in a surface of the separator does not need to have a flat recessed surface. The recessed portion may also be provided with protrusions protruding from its surface. The recessed portion needs merely to extend in a surface of the separator between the first hole and the second hole, via at least the third hole.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIG. 3 is a perspective external view of the stack structure;

DETAILED DESCRIPTION OF PREFERRED EMBODIMENTS

Preferred embodiments of the present invention will be described in detail hereinafter with reference to the accompanying drawings.

Figure 1:
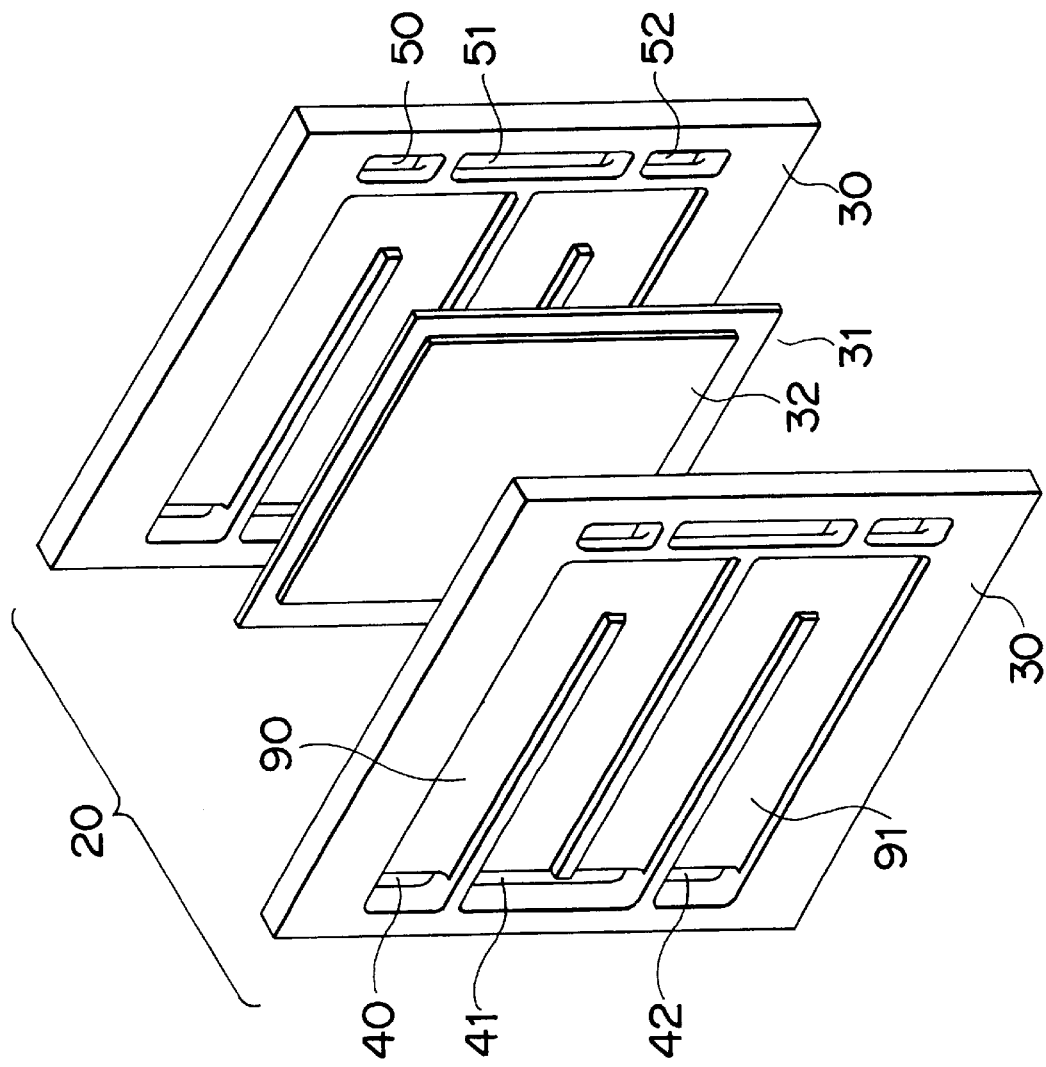
FIG. 1 is an exploded perspective view of a unit cell which is a component unit of a stack structure that forms a fuel cell according to a first embodiment of the invention.
Figure 2:
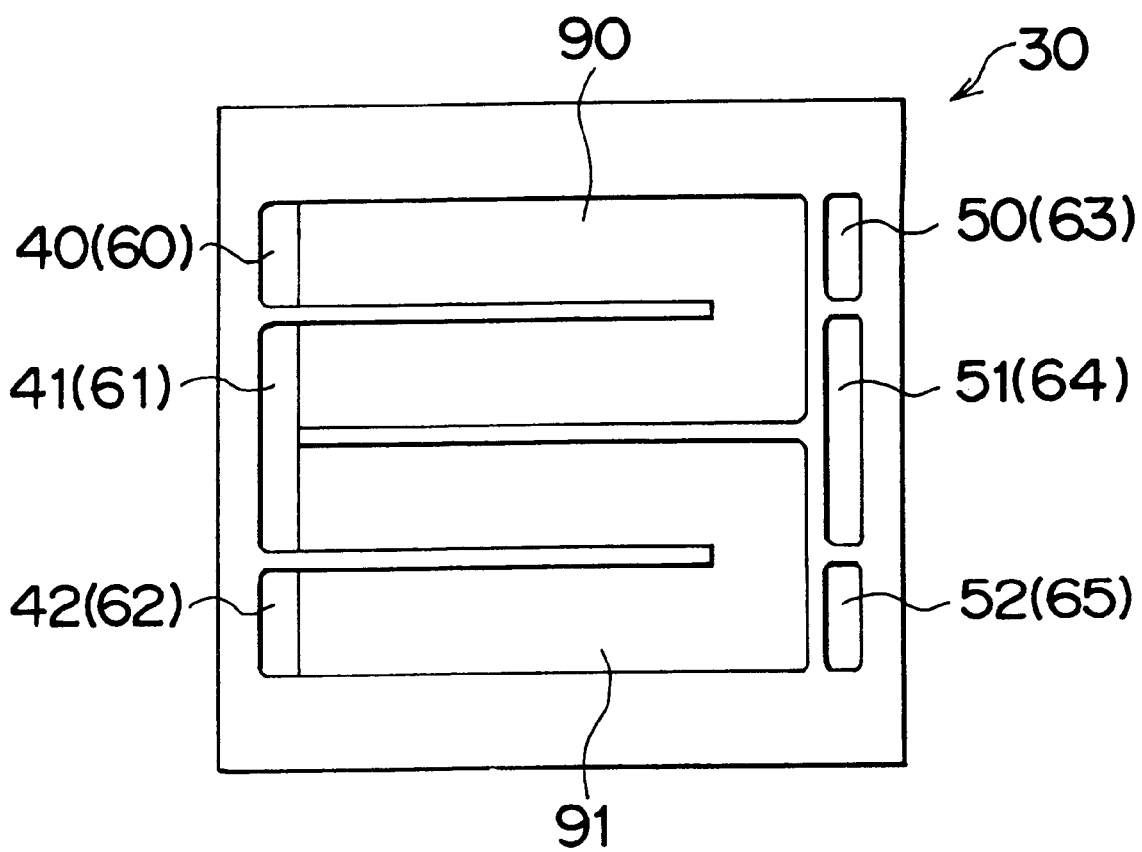
FIG. 2 is a plan view of a separator shown in FIG. 1.

A fuel cell according to a first embodiment of the invention is a polymer electrolyte fuel cell having a stack structure formed by stacking a plurality of unit cells, that is, unit components. FIG. 1 is an exploded perspective view of a unit cell 20, that is, a component unit of a stack structure 15 that forms a fuel cell according to the first embodiment. FIG. 2 is a plan view of a separator 30 employed by the fuel cell of this embodiment. FIG. 3 is a perspective external view of the stack structure 15. The construction of the fuel cell of this embodiment will first be described with reference to FIGS. 1 through 3.

As shown in FIG. 1, the unit cell 20 has an electrolyte membrane 31, an anode 32, a cathode (not shown), and a separator 30.

The electrolyte membrane 31 is a proton-conductive ion exchange membrane formed from a solid polymer material, for example, a fluorine-based resin. The electrolyte membrane 31 has a good electrical conductivity in a wet condition. In this embodiment, a Nafion membrane (by Du Pont) is used for the electrolyte membrane 31. A surface of the electrolyte membrane 31 is coated with a platinum or an alloy metal of platinum and another metal, as a catalyst. It is possible to employ a coating method as follows. That is, carbon powder loaded with platinum or an alloy of platinum and another metal is prepared, and the catalyst-loaded carbon powder is dispersed in a suitable organic solvent. A suitable amount of an electrolyte solution (for example, Nafion Solution by Aldrich Chemical) is added to the solvent containing dispersed carbon, to form a paste. The paste is applied to the electrolyte membrane 31 by screen printing. It is also possible to form a sheet of a paste containing carbon loaded with the aforementioned catalyst through film formation, and press the sheet onto the electrolyte membrane 31. The anode 32 and the cathode are gas diffusion electrodes formed of carbon cloths produced by weaving yarns of carbon filaments. The anode 32 and the cathode may also be formed of a carbon felt or a carbon paper formed of carbon fiber or filaments. The anode 32 and the cathode are not particularly restricted, as long as they have a sufficiently high gas diffusion property and a sufficiently high electrical conductivity.

The separator 30 is formed by a gas-impermeable electrically conductive member, for example, a formed carbon member that has been made gas-impermeable by compressing a carbon material. As shown in FIG. 2, the separator 30 has six holes extending therethrough near its periphery. Three holes 40, 41, 42 are formed in a contiguous arrangement along one side of the separator 30. Formed along the opposite side of the separator 30 are the other three holes 50, 51, 52 in a contiguous arrangement. The separator 30 further has predetermined-shape recessed portions formed in the surface shown in FIG. 2 and the surface opposite thereto. The surface shown in FIG. 2 has a recessed portion 90 that extends in a folded shape and connects the hole 40 and the hole 41, and a recessed portion 91 that extends in a folded or serpentine shape and connects the hole 41 and the hole 42. Similarly, the opposite surface of the separator 30 has a recessed portion (not shown) that extends in a folded shape and connects the hole 50 and the hole 51, and a recessed portion (not shown) that extends in a folded shape and connects the hole 51 and the hole 52.

As indicated in FIG. 1, the unit cell 20 is formed by stacking unit cells 20 composed of the separator 30, the electrolyte membrane 31, the anode 32 and the cathode 33. When such unit cells 20 are stacked to form a stack structure 15, the recessed portions of each separator 30 form in-cell gas passages together with the adjacent gas diffusion electrodes. More specifically, the recessed portion 90 connecting the holes 40, 41 and the recessed portion 91 connecting the holes 41, 42 form, together with the adjacent surface of the cathode 33, in-cell oxidative gas passages. The recessed portion (not shown) connecting the holes 50, 51 and the recessed portion (not shown) connecting the holes 51, 52 form, together with the adjacent surface of the anode 32, in-cell fuel gas passages.

When the stack structure 15 is formed by stacking unit cells 20, the holes 40 of the separators 30 form an oxidative gas supply manifold 60 extending through the interior of the stack structure 15 in the stacking direction. Likewise, the holes 41 of the separators 30 form an oxidative gas transit manifold 61 extending through the interior of the stack structure 15 in the stacking direction. The holes 42 form an oxidative gas discharge manifold 62 extending through the interior of the stack structure 15 in the stacking direction. The holes 50 of the separators 30 form a fuel gas supply manifold 63 extending through the interior of the stack structure 15 in the stacking direction. The holes 51 form a fuel gas transit manifold 64, and the holes 52 form a fuel gas discharge manifold 65 (see FIG. 2). The gas flow in the gas passages formed in the stack structure 15 will be described in detail below (see FIG. 5).

In assembling the stack structure 15, the aforementioned components are stacked sequentially in the order of a separator 30, an anode 32, an electrolyte membrane 31, a cathode 33, a separator 30, and so on, to form a stack of unit cells. After that, collecting plates 36, 37, insulating plates 38, 39, and end plates 80, 85 are sequentially placed on the opposite ends of the stack of unit cells, thereby completing a stack structure 15 as shown in FIG. 3.

The collecting plates 36, 37 are formed by gas-impermeable and electrically conductive members, such as copper plates, dense carbon members, or the like. The insulating plates 38, 39 are formed by insulating members made of rubber, resin or the like. The end plates 80, 85 are formed from a metal having a rigidity, such as steal or the like. The collecting plates 36, 37 have output terminals 36A, 37A, respectively, for outputting an electromotive force produced by the fuel cell formed by the stack structure 15. The collecting plate 36, the insulating plate 38 and the end plate 80 each have four holes at corresponding positions, so that the four holes of each plate coincide with the corresponding holes of the other plates. More specifically, the end plate 80 has holes 70, 72, 73, 75 (see FIG. 3). The hole 70 and holes formed in the collecting plate 36 and the insulating plate 38 at a position corresponding to the position of the hole 70 form a gas passage that connects to the oxidative gas supply manifold 60, when the stack structure 15 is formed. The hole 72 and holes formed in the collecting plate 36 and the insulating plate 38 at a position corresponding to the position of the hole 72 form a gas passage that connects to the oxidative gas discharge manifold 62, when the stack structure 15 is formed. Likewise, the hole 73 and holes formed in the collecting plate 36 and the insulating plate 38 at a position corresponding to the position of the hole 73 form a gas passage that connects to the fuel gas supply manifold 63. The hole 75 and holes formed in the collecting plate 36 and the insulating plate 38 at a position corresponding to the position of the hole 75 form a gas passage that connects to the fuel gas discharge manifold 65.

For operation of the fuel cell formed by the stack structure 15, a fuel gas supply device (not shown) is connected to the hole 73 of the end plate 80 to supply a gas rich in hydrogen into the fuel cell. Furthermore, an oxidative gas supply device (not shown) is connected to the hole 70 so supply an oxidative gas (air) containing oxygen into the fuel cell. The fuel gas supply device and the oxidative gas supply device add predetermined amounts of moisture and pressure to the respective gases before supplying them to the fuel cell. Still further, for operation of the fuel cell, a fuel gas discharge device (not shown) and an oxidative gas discharge device (not shown) are connected to the hole 75 and the hole 72, respectively. The fuel gas may be a hydrogen-rich gas obtained by reforming a hydrocarbon, or may also be a high-purity hydrogen gas.

The sequence of stacking the aforementioned components of the stack structure 15 is described above. The electrolyte membrane 31 has a predetermined seal member that is provided in a peripheral portion of the electrolyte membrane 31, more specifically, in a region of the electrolyte membrane 31 that contacts the separator 30. The seal member prevents leakage of the fuel gas and the oxidative gas from each unit cell, and also prevents the fuel gas and the oxidative gas from mixing in the stack structure 15.

The stack structure 15, having the above-described components, is held in a condition where the stack structure 15 receives a pressing force in the stacking directions. The fuel cell is thus completed. A construction for pressing the stack structure 15 is not shown in the drawings. The pressing construction may employ bolts and nuts to clamp the stack structure 15. The pressing construction may also employ a stack-housing member of a predetermined shape, wherein after the stack structure 15 is placed in the housing member, opposite end portions of the housing member are bent so as to apply a pressing force to the stack structure 15.

Although the above-described separator 30 is formed by using a gas-impermeable dense carbon material obtained by compressing carbon, it is also possible to form a separator 30 by using a different material. For example, the separator 30 may also be formed from a sintered carbon material, a metal material, or the like. If a metal material is used to form the separator 30, it is preferred to select a metal material having a sufficiently high corrosion resistance or to coat a metal member with a material having a sufficiently high corrosion resistance.

The separator 30 in this embodiment has holes for forming a cooling water passage that conveys cooling water, in addition to the holes 40-42 for forming the oxidative gas manifolds and the holes 50-52 for forming the fuel gas manifolds. Since the electrochemical reaction that occurs in the fuel cell is an exothermic reaction, the internal temperature of the fuel cell is maintained within a predetermined range by circulating cooling water in the cooling water passage formed by the aforementioned holes of the separators 13 in this embodiment. The holes for forming the cooling water passage may be formed in the separators 30, at positions near two sides of each separator 30 that are relatively remote from the holes 40–42 and 50–52. The construction for circulation of cooling water is not directly related to the gist of the invention, and will not be further described.

Figure 4A:
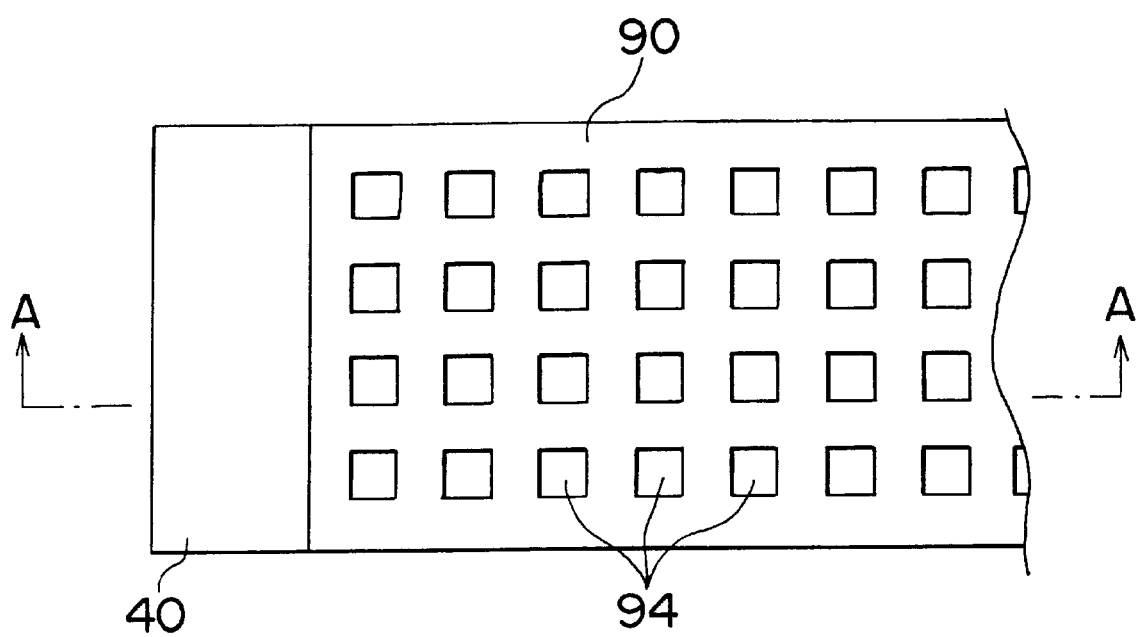
FIGS. 4A and 4B illustrate protrusions formed in a recessed portion of a separator.
Figure 4B:
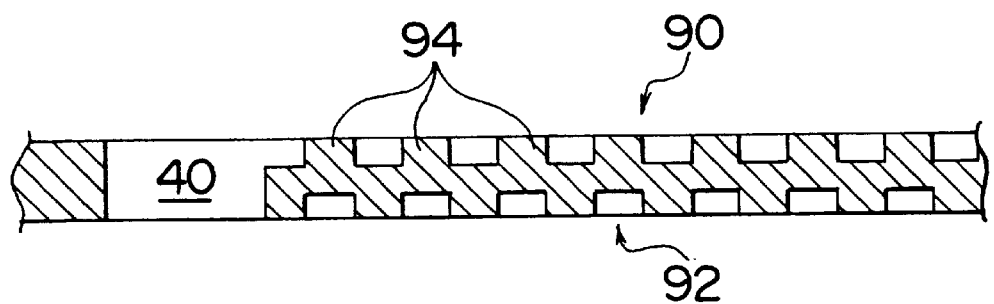

Although the recessed portions 90, 91 of the separator 30 are shown in FIGS. 1 and 2 as grooves each having a flat bottom surface in order to facilitate the illustration of gas flow in a unit cell, each of the recessed portions 90, 91 and the recessed portions 92, 93 (not shown) is actually provided with a plurality of predetermined-shape protrusions protruding from a bottom surface thereof. FIGS. 4A and 4B show an example of such a protrusion structure provided in each of the recessed portions 90, 91, 92, 93. FIG. 4A is an enlarged plan view of the hole 40 and an upper portion of the recessed portion 90, and FIG. 4B is a sectional view taken on line A—A in FIG. 4A. As shown in FIGS. 4A and 4B, the protrusions 94 have a generally rectangular sectional shape, and substantially the same height. When the stack structure 15 is assembled, a distal end of each protrusion 94 contacts the adjacent cathode 33. The areas contacting the cathode secure a sufficiently high electrical conductivity in the fuel cell. Furthermore, the protrusions 94 collide with the oxidative gas flowing through each in-cell oxidative gas passage, and thereby diffuse the gas in the in-cell oxidative gas passage, so that the gas is efficiently supplied to the catalyst layer provided on the surface of each electrolyte membrane 31.

Thus, the protrusions 94 formed in the recessed portion 90 secures a sufficiently high electrical conductivity by their distal ends contacting the adjacent gas diffusion electrode, and efficiently supplies the oxidative gas for the electrochemical reaction to increase the gas utilization rate by diffusing the gas flowing through the in-cell gas passage formed by the recessed portion 90. The recessed portions 91, 92, 93 also have protrusions similar to the protrusions 94 of the recessed portion 90, and perform substantially the same functions. Although the protrusions 94 shown in FIGS. 4A and 4B have a generally rectangular sectional shape, it is also possible to arrange protrusions having different shapes, at different positions. For example, it is possible to form a recessed portion with rib-like protrusions extending in the direction of gas flow in the passage so that the recessed portion is divided into narrow grooves extending parallel. The recessed portions formed in the opposite surfaces of each separator 30 are not particularly restricted, as long as the in-cell gas passages formed in a fuel cell assembly allow gas to flow between the gas manifolds formed by the holes connected to the recessed portions.

Figure 5:
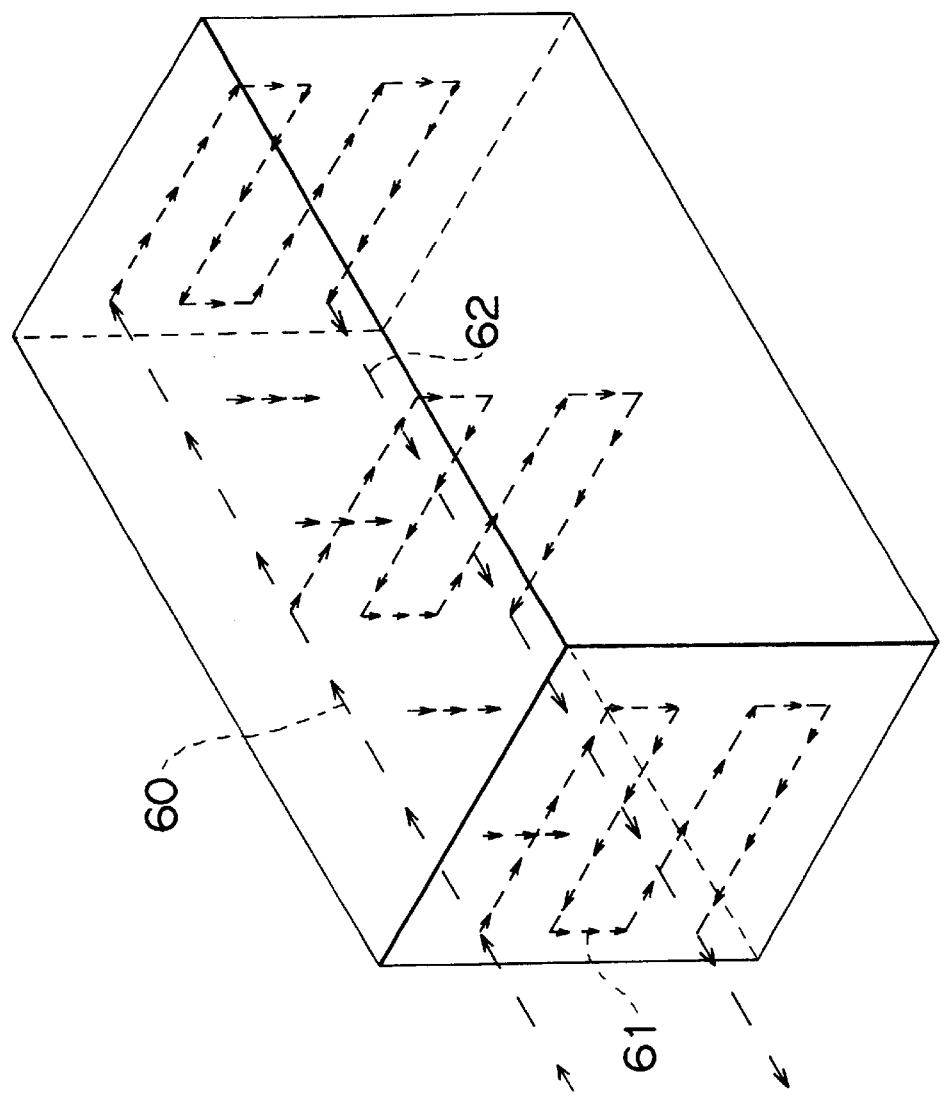
FIG. 5 is a three-dimensional illustration of the flow of the oxidative gas in the stack.

The flow of the fuel gas and the oxidative gas in the fuel cell having the above-described construction will be described below. The flow of the oxidative gas will first be described. FIG. 5 is a three-dimensional illustration of the flow of the oxidative gas in the stack structure 15. The oxidative gas supply device provided outside the fuel cell is connected to the hole 70 of the end plate 80 as described above. The oxidative gas (pressurized air) from the oxidative gas supply device is introduced into the oxidative gas supply manifold 60 via the holes formed in the insulating plate 38 and the collecting plate 36 at the position corresponding to the position of the hole 70. The oxidative gas flowing in the oxidative gas supply manifold 60 is led into the oxidative gas passage formed between the recessed portion 90 of the separator 30 and the adjacent cathode in each unit cell 20. After being led into the in-cell oxidative gas passage in each unit cell 20, the oxidative gas diffuses from the in-cell oxidative gas passage into the catalyst layer formed on the electrolyte membrane 31. The oxidative gas is thus supplied for the electrochemical reaction in each unit cell. The residual amount of the oxidative gas not used by the electrochemical reaction temporarily flows in the oxidative gas transit manifolds 61 formed by the holes 41 of the separators 30.

The oxidative gas transit manifold 61 communicates with the in-cell oxidative gas passages, so that the flows of the oxidative gas from the in-cell oxidative gas passages gather in the oxidative gas transit manifold 61. The confluence of the oxidative gas moves downwards (see FIG. 5) in the oxidative gas transit manifold 61. The oxidative gas is then led from the oxidative gas transit manifold 61 into the in-cell oxidative gas passage formed between the recessed portion 91 of the separator 30 and the adjacent cathode in each unit cell 20 via the hole 41 of each separator 30. After being introduced into each of the in-cell oxidative gas passages, the oxidative gas diffuses therefrom into the catalyst layer formed on the electrolyte membrane 31. The oxidative gas is thus supplied for the electrochemical reaction in each unit cell 20. The residual amount of the oxidative gas not used by the electrochemical reaction is let out into the oxidative gas discharge manifold 62 formed by the holes 42 of the separators 30.

In the oxidative gas discharge manifold 62, the oxidative gas flows in a direction opposite to the flowing direction in the oxidative gas supply manifold 60, while the flows of the oxidative gas from the in-cell oxidative gas passages formed in the individual unit cells 20 gather in the oxidative gas discharge manifold 62. At the end of the stack structure 15 (the end of the oxidative gas discharge manifold 62), the oxidative gas is let out of the oxidative gas discharge manifold 62 into the oxidative gas discharge device, via the hole 72 of the end plate 80 and the holes formed at the corresponding position in the collecting plate 36 and the insulating plate 38.

The flow of the fuel gas in the stack structure 15 is substantially the same as the above-described flow of the oxidative gas in the stack structure 15. The fuel gas supply device provided outside the fuel cell is connected to the hole 73 of the end plate 80. The fuel gas from the fuel gas supply device is introduced into the fuel gas supply manifold 63 formed by the holes 50 of the separators 30, via the holes formed in the insulating plate 38 and the collecting plate 36 at the position corresponding to the position of the hole 73 of the end plate 80. The fuel gas is led from the fuel gas supply manifold 63 into the fuel gas passage formed between the recessed portion of the separator 30 and the adjacent anode 32 in each unit cell 20. The fuel gas is thus supplied for the electrochemical reaction in each unit cell. The residual amount of the fuel gas not used by the electrochemical reaction temporarily flows in the fuel gas transit manifold 64 formed by the holes 51 of the separators 30. The fuel gas then flows from the fuel gas transit manifold 64 into the in-cell fuel gas passage formed between the recessed portion of the separator 30 and the adjacent anode 32 in each unit cell 20. While flowing through the in-cell fuel gas passages, the fuel gas is used by the electrochemical reaction. The residual amount of the fuel gas not used by the electrochemical reaction is let out into the fuel gas discharge manifold 65 formed by the holes 52 of the separators 30. Thus, the flows of the fuel gas from the in-cell fuel gas passages gather in the fuel gas discharge manifold 65, and the confluence of the fuel gas moves in a direction opposite to the flowing direction in fuel gas supply manifold 63. At the end of the stack structure 15 (the end of the fuel gas discharge manifold 65), the fuel gas is let out of the fuel gas discharge manifold 65 into the fuel gas discharge device, via the hole 75 of the end plate 80 and the holes formed at the corresponding position in the collecting plate 36 and the insulating plate 38.

Although in the above description, the oxidative gas supply manifold 60 and the oxidative gas discharge manifold 62, and the fuel gas supply manifold 63 and the fuel gas discharge manifold 65 convey the gas in the opposite directions, it is also possible to adopt a manifold construction in which the supply manifolds and the discharge manifolds convey the gases in the same direction. In this construction, the oxidative gas discharge device and the fuel gas discharge device may be connected to the side of the end plate 85, so that the oxidative and fuel gases are discharged at the end of the stack structure 15 opposite from the end where the gases are supplied.

In the fuel cell having the separators 30 according to this embodiment, the fuel gas and the oxidative gas temporarily flow in the oxidative gas transit manifold and the fuel gas transit manifold, respectively, when flowing from one in-cell gas passage into the other in-cell gas passage in each unit cell. Therefore, if the flow of the oxidative gas or the fuel gas varies among the in-cell gas passages in the fuel cell due to water condensation in a unit cell of the fuel cell or a low forming precision of the protrusions in the recessed portion of a separator, the flows of the gas from the in-cell gas passages substantially merge in the transit manifold, so that substantially equalized flows of the gas can be supplied from the transit manifold into the individual in-cell gas passages of the next stage. Thus, the transit manifold reduces the variation in the gas flow rate in the in-cell gas passages. For example, if the flow rate of the oxidative gas in the oxidative gas passage formed by the recessed portion 90 of a unit cell 20 of the fuel cell is reduced by water condensation occurring therein, the flow of the oxidative gas from that unit cell is combined with a supplemental flow of the oxidative gas from adjacent unit cells when flowing in the oxidative gas transit manifold. Therefore, an extreme reduction in the flow of the oxidative gas through the downstream in-cell oxidative gas passage formed by the recessed portion 91 can be prevented. Conversely, if the flow rate of the oxidative gas in the oxidative gas passage formed by the recessed portion 91 of a unit cell 20 of the fuel cell is reduced by water condensation occurring therein, the oxidative gas can still flow at a sufficiently high flow rate through the upstream in-cell oxidative gas passage formed by the recessed portion 90 since the upstream in-cell oxidative gas passage is connected to the oxidative gas transit manifold. Therefore, this embodiment, employing the gas transit manifolds, is able to prevent or curb the performance deterioration of the fuel cell caused by varied gas flow rates the in-cell gas passages.

Figure 6:
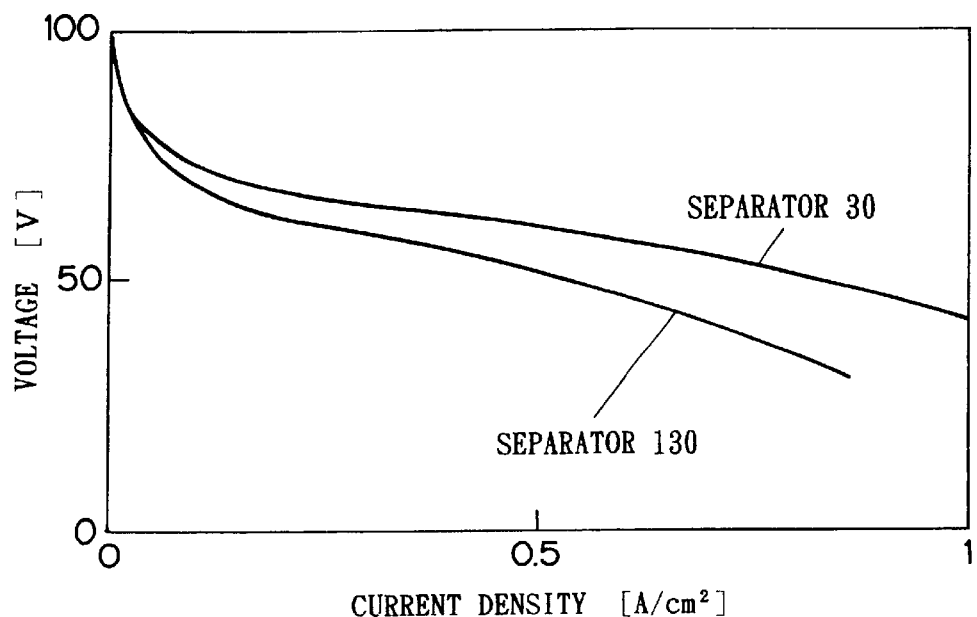
FIG. 6 is a graph indicating a current-voltage characteristic of the fuel cell.
Figure 8:
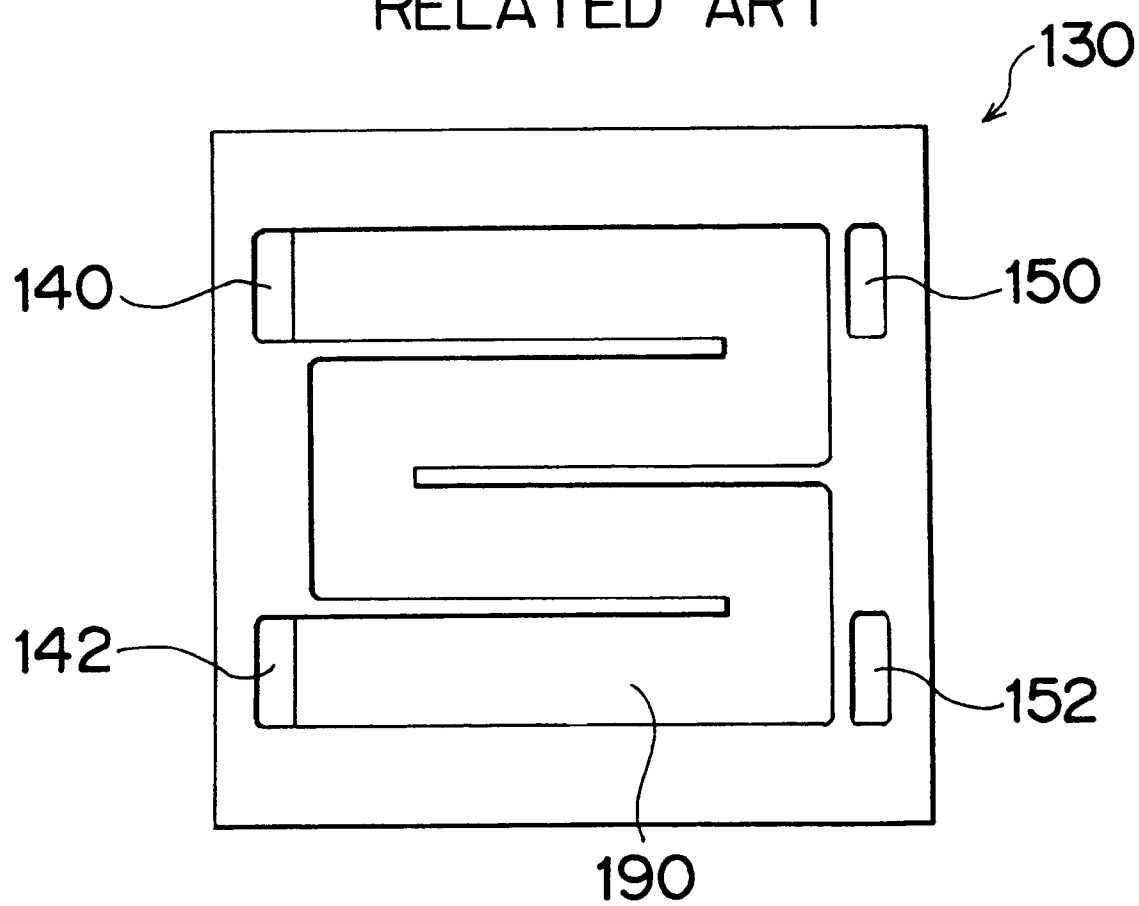
FIG. 8 is a plan view of a control example separator.

FIG. 6 is a graph indicating the current-voltage characteristic of a fuel cell incorporating separators 30 according to this embodiment in comparison with that of a control example fuel cell incorporating separators 130 (according to a related art) as shown in FIG. 8. Each separator 130 has a construction similar to that of the separator 30, but does not have holes corresponding to the holes 41 and 51. That is, one surface of the separator 130 is provided with a single recessed portion 190 having three turns, as shown in FIG. 8. Therefore, the fuel cell incorporating the separators 130 does not have either an oxidative gas transit manifold or a fuel gas transit manifold, so that each in-cell gas passage does not communicate with another in-cell gas passage in part way. Portions of the separator 130 in FIG. 8 comparable to those of the separator 30 are represented by reference numerals whose lower two digits equal to the reference numerals of the comparable portions of the separator 30, and will not be described in detail again. The recessed portion 190 of the separator 130 has protrusions similar to those of the recessed portion 90 of the separator 30, and the protrusions of the recessed portion 190 have substantially the same area as the protrusions of the recessed portion 90, for contacting the adjacent gas diffusion electrode to secure a certain electrical conductivity.

As indicated in FIG. 6, the fuel cell incorporating the separators 30 and therefore having the oxidative gas transit manifold and the fuel gas transit manifold produced higher output voltages particularly in a relatively high output current range than the fuel cell lacking an oxidative gas transit manifold and a fuel gas transit manifold. Thus, the graph of FIG. 6 indicates that the performance deterioration of a fuel cell can be reduced by the gas transit manifolds substantially equalizing the gas flow rates in the in-cell gas passages.

Figure 7:
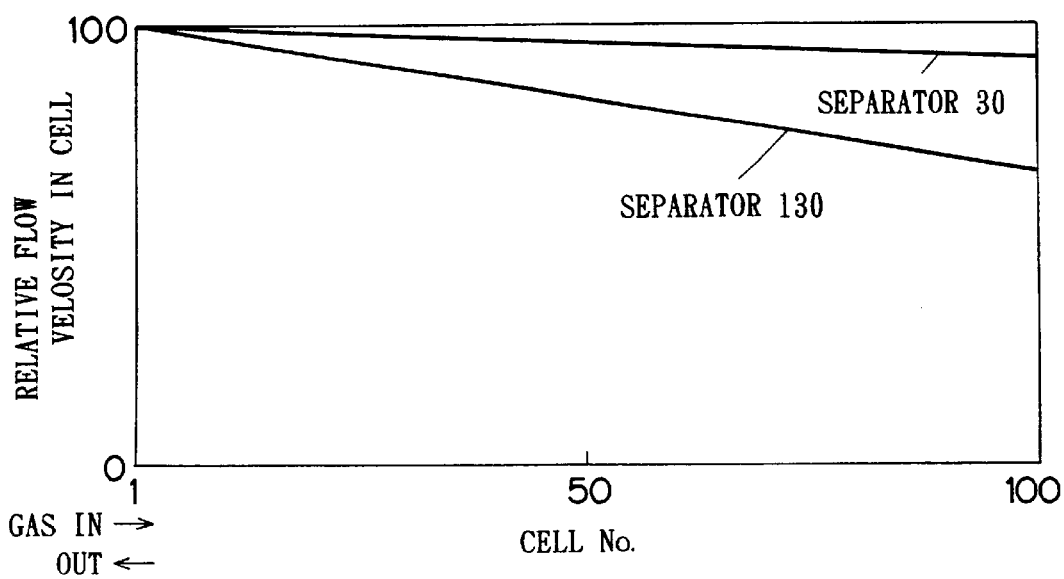
FIG. 7 is a graph indicating the relative flow velocity in each unit cell of the fuel cell.

In addition to the aforementioned advantage that if the gas flow rate decreases in a gas passage in one or more unit cells of a fuel cell the gas flow rate in the gas passage is substantially equalized to the normal gas flow rate, the fuel cell incorporating the separators 30 achieves an advantage of substantially leveling the gradient of the gas flow velocities in the in-cell gas passages in the entire fuel cell. FIG. 7 is a graph indicating the distribution of gas flow velocities in in-cell gas passages in a fuel cell that incorporated separators 30 as shown in FIG. 2 and the distribution of gas flow velocities in a fuel cell that incorporated separators 130 as shown in FIG. 8. Each fuel cell had a stack of 100 unit cells. The gas flow velocity occurring when the gas flowed from the gas supply manifold into an in-cell gas passage was measured as a gas flow velocity in the in-cell gas passage.

In the graph of FIG. 7, the gas flow velocities in the individual in-cell gas passages are indicated by relative values where the gas flow velocity in the in-cell gas passage in the unit cell (No. 1) provided at the upstream end of the fuel cell (the end thereof where gas supply devices and gas discharge devices are connected) is determined as a reference value of 100. If the gas supply devices and the gas discharge devices are connected to one end of a fuel cell as described above, the gas flow velocity becomes the greatest at the upstream end where the devices are connected, and gradually decreases toward the opposite end (downstream end). In both the fuel cell incorporating the separators 30 and the fuel cell incorporating the separators 130, the gas flow velocity gradually decreased from the upstream end toward the downstream end (from cell No. 1 toward cell No. 100) as indicated in FIG. 7. However, the decreasing gradient of the gas flow velocity toward the downstream end was more gentle in the fuel cell incorporating the separators 30 than in the fuel cell incorporating the separators 130 (control example).

In a fuel cell incorporating separators 30 according to the embodiment, the gradient of the gas flow velocities in the in-cell passages is reduced and high gas flow velocities in the in-cell gas passages are maintained, so that unit cells disposed at the downstream side achieve increased gas utilization rates. Therefore, the high cell performance of the fuel cell incorporating the separators 30 can be considered as an effect of the sufficiently high gas flow velocities maintained in the entire fuel cell as indicated in FIG. 6.

The increased gas flow velocities in the in-cell passages in the entire fuel cell result in a sufficiently high gas flow rate in the entire fuel cell. Therefore, the pressurization of the gases to be supplied to the fuel cell in order to secure sufficiently high gas flow rates in a region where the gas flow rate becomes the least can be reduced to some extent. Furthermore, the sufficiently increased gas utilization rate of the entire fuel cell makes it possible to reduce the flow rates of the gases to be supplied to the fuel cell. A typical fuel cell is supplied with amounts of the gases that exceed required amounts of the gases theoretically determined from the electric energy that needs to be generated, in order to cause the electrochemical reactions to sufficiently progress. If the gas utilization rate is increased as described above, the excess amounts of the gasses to be supplied to the fuel cell can be reduced. The reduction in the amounts of the gasses to be supplied to the fuel cell and the reduction of the gas pressurization to a certain level lead to a reduction in the electric energy consumed for power generation. Therefore, the energy efficiency of the entire system incorporating the fuel cell can be improved.

Furthermore, in a fuel cell incorporating separators 30 according to the embodiment, the gasses flow from top to bottom in the entire gas passage although in the in-cell gas passages formed in the unit cells, the gasses flow substantially horizontally following the shape of the recessed portions formed in each separator 30. For example, the oxidative gas flows from an upper side of each separator 30 where the hole 40 is formed toward a lower side where the hole 42 is formed. Therefore, if water condenses in a gas passage, water is conveyed together with the gas flow downwards in accordance with the gravity. Thus, condensed water can easily be discharged from the in-cell gas passage.

The aforementioned "condensed water" in a passage includes water formed in the gas passage by condensation of water vapor added to the gasses before they are supplied to the fuel cell in order to prevent the electrolyte membranes from drying, water produced at the cathodes by the electrochemical reaction, and the like.

Further, in a fuel cell incorporating separators 30 according to the embodiment, the gas manifolds extend in side portions of the fuel cell, so that the gases flow substantially horizontally from the gas manifolds into the gas passages in each unit cell. Therefore, if water condenses in a gas manifold, the manifold construction in this embodiment prevents condensed water from residing at or closing a junction between the gas manifold and an in-cell gas passage and impeding or blocking the gas flow. In contrast, in a fuel cell in which the gas manifolds extend in upper and lower portions of the so that the gasses flow vertically from the upper manifolds into the in-cell gas passages, condensed water is likely to flow from the gas manifold into an in-cell gas passage and close the gas passage.

Figure 9:
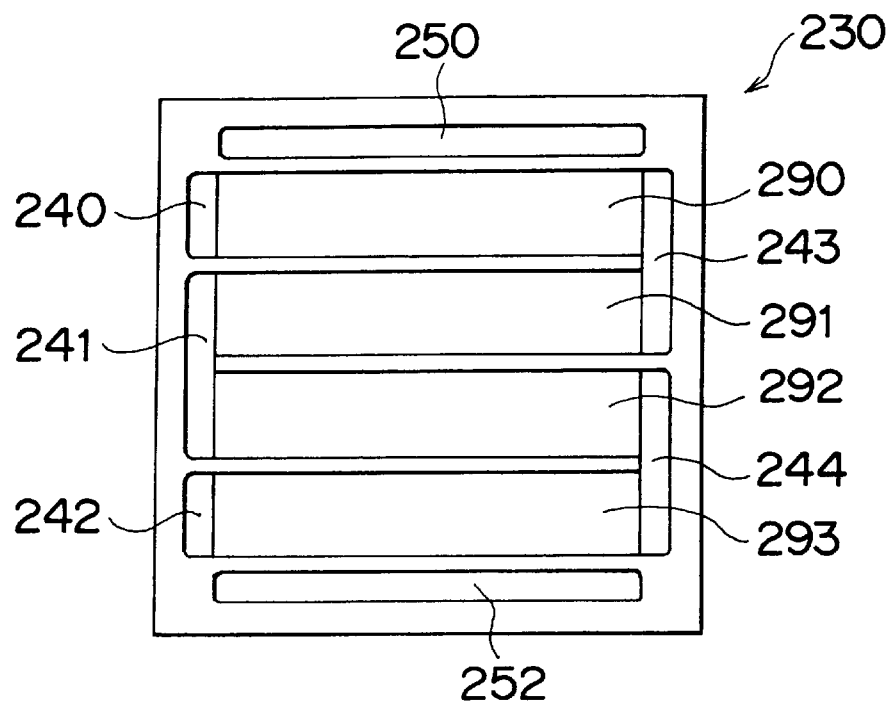
FIGS. 9 through 13 are plan views of separators according to embodiments of the invention.

Each of the opposite surfaces of each separator 30 according to the embodiment is divided into four horizontally extending portions, wherein the upper and lower two portions are interconnected to make upper and lower pairs. For example, in the surface of each separator 30 shown in FIG. 2, the upper and lower pairs form the recessed portion 90 and the recessed portion 91, respectively. The recessed portions 90, 91 in each separator 30 are interconnected by the hole 41, which forms the single oxidative gas transit manifold 61. However, it is also possible to form a plurality of oxidative gas transit manifolds or a plurality of fuel gas transit manifolds in a separator. An example of such a separator is shown in FIG. 9 (second embodiment). One surface of a separator 230 shown in FIG. 9 is divided into four horizontally extending portions as in the separator 30. The divided portions form four different recessed portions 290, 291, 292, 293, respectively. In a fuel cell incorporating separators 230, the recessed portions of each separator 230 form in-cell oxidative gas passages, together with the adjacent gas diffusion electrode. Each separator 230 also has five holes 240, 241, 242, 243, 244. In the fuel cell incorporating separators 230, the holes form gas manifolds that convey the oxidative gas.

The holes 240 of the separators 230 form an oxidative gas supply manifold. The oxidative gas supply manifold conveys a supply of the oxidative gas from the outside of the fuel cell to the in-cell gas passages. The holes 242 of the separators 230 form an oxidative gas discharge manifold. The oxidative gas discharge manifold collects the flows of the oxidative gas from the gas passages of individual unit cells, and conveys the confluence to the outside of the fuel cell. The holes 241, 243, 244 form three different oxidative gas transit manifolds. The oxidative gas temporarily flows in the oxidative gas transit manifolds when flowing through the in-cell oxidative gas passages of each unit cell.

The recessed portion 290 connects the hole 240 and the hole 243 in each separator 230, and the recessed portion 291 connects the hole 243 and the hole 241. Likewise, the recessed portion 292 connects the hole 241 and the hole 244, and the recessed portion 293 connects the hole 244 and the hole 242. Therefore, after being introduced into the fuel cell from the outside, the oxidative gas flows from the oxidative gas supply manifold formed by the holes 240 into the in-cell oxidative gas passage formed by the recessed portion 290 of each separator 230. After flowing through the in-cell oxidative gas passage formed by the recessed portion 290, the oxidative gas flows into the in-cell oxidative gas passage formed by the recessed portion 291 of each separator 230, via the oxidative gas transit manifold formed by the holes 243 of the separators 230. Then, the oxidative gas flows through similarly formed passages. That is, the oxidative gas flows into the in-cell oxidative gas passage formed by the recessed portion 292 of each separator 230, via the oxidative gas transit manifold formed by the holes 241 of the separators 230. Subsequently, the oxidative gas flows into the in-cell oxidative gas passage formed by the recessed portion 293 of each separator 230, via the oxidative gas transit manifold formed by the holes 244 of the separators 230. After that, the oxidative gas flows into the oxidative gas discharge manifold formed by the holes 242 of the separators 230, whereby the oxidative gas is conveyed out of the fuel cell.

The fuel cell incorporating the separators 230 substantially equalizes the flow rates of the oxidative gas supplied into the in-cell gas passages, and maintains sufficiently high gas flow velocities, and prevents a reduction in the performance of the fuel cell, as in the first embodiment incorporating separators 30. In particular, the separators 230 form a greater number of oxidative gas transit manifolds than the separators 30, so that the advantage of equalizing the oxidative gas flow rates in the unit cells can be further enhanced.

Although the fuel cell incorporating the separators 30 in the first embodiment have the oxidative gas transit manifold and the fuel gas transit manifold, it is also possible to provide one or more transit manifolds for only one of the oxidative gas and the fuel gas. Such a construction still achieves good advantages as described above. The separators 230 as shown in FIG. 9 have only two fuel gas passages (supply and discharge passages) that are formed by holes 250, 252 of each separator 230. That is, the gas transit manifolds formed are only for the oxidative gas. This manifold construction also sufficiently equalizes the oxidative gas flow rates in the unit cells, thereby achieving substantially the same advantages as achieved by the first embodiment. A manifold construction in which one or more transit manifolds are provided only for the fuel gas also sufficiently equalizes the fuel gas flow rates in the unit cells, thereby achieving substantially the same advantages as achieved by the first embodiment. If a manifold construction in which one or more transit manifolds are provided only for one of the oxidative gas and the fuel gas is adopted, it becomes unnecessary to form holes in each separator for forming one or more transit manifolds for the other gas. Therefore, the separators can more easily be formed.

Figure 10:
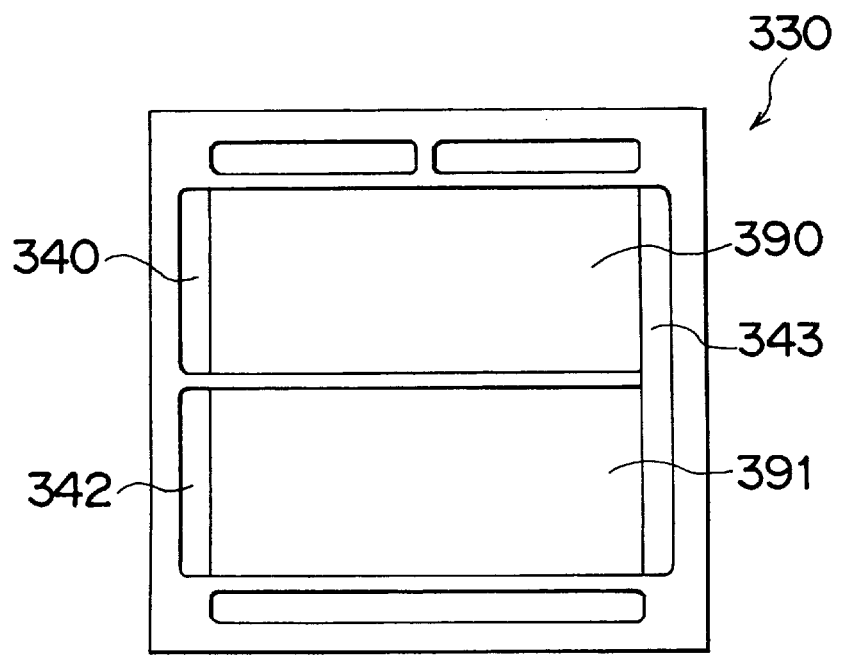

Although in the foregoing embodiments, each of the opposite surfaces of each separator is divided into four horizontally extending portions, it is also possible to divide a separator surface into a different number of portions or regions and correspondingly form one or more gas transit manifolds. Examples of such a separator will be described below. FIG. 10 is a plan view of a separator 330 in which a surface is divided into two horizontally extending portions. In a fuel cell incorporating separators 330, upper and lower recessed portions 390, 391 of each separator 330 form in-cell oxidative gas passages. In a fuel cell incorporating separators 330, holes 340 of the separators 330 form an oxidative gas supply manifold, and holes 342 of the separators 330 form an oxidative gas discharge manifold, and holes 343 of the separators 330 form an oxidative gas transit manifold. When the oxidative gas is supplied to the fuel cell, the oxidative gas flows from the oxidative gas supply manifold into each unit cell. After flowing through the in-cell gas passage formed by the recessed portion 390, the oxidative gas temporarily flows in the oxidative gas transit manifold, and then flows into the in-cell gas passage formed by the recessed portion 391. After that, the oxidative gas flows into the oxidative gas discharge manifold, whereby the oxidative gas is conveyed out of the fuel cell.

Figure 11:
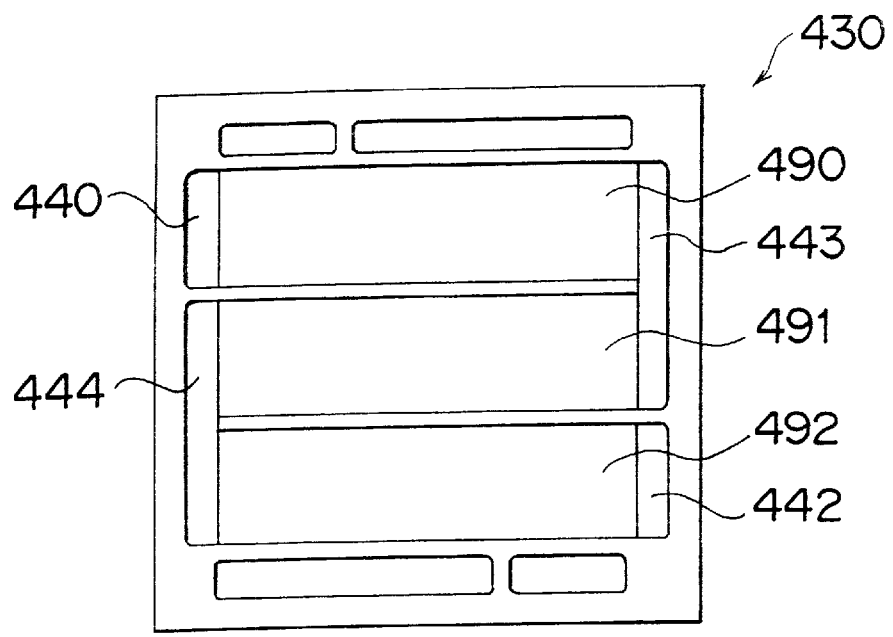

FIG. 11 is a plan view of a separator 430 in which a surface is divided into three horizontally extending portions. In a fuel cell incorporating separators 430, three horizontally extending recessed portions 490, 491, 492 of each separator 430 form in-cell oxidative gas passages. In the fuel cell, holes 440 of the separators 430 form an oxidative gas supply manifold, and holes 442 of the separators 430 form an oxidative gas discharge manifold, and holes 443, 444 of the separators 430 form oxidative gas transit manifolds. The oxidative gas flows from the oxidative gas supply manifold into each unit cell, and then flows sequentially through the in-cell oxidative gas passages formed by the recessed portions 490, 491, 492. When flowing from an in-cell oxidative gas passage into the next in-cell passage, the oxidative gas temporarily flows in one of the oxidative gas transit manifolds that connects the two adjacent in-cell oxidative gas passages. After flowing through the in-cell oxidative gas passage formed by the recessed portion 492, the oxidative gas flows into the oxidative gas discharge manifold, whereby the oxidative gas is led out of the fuel cell.

Figure 12:
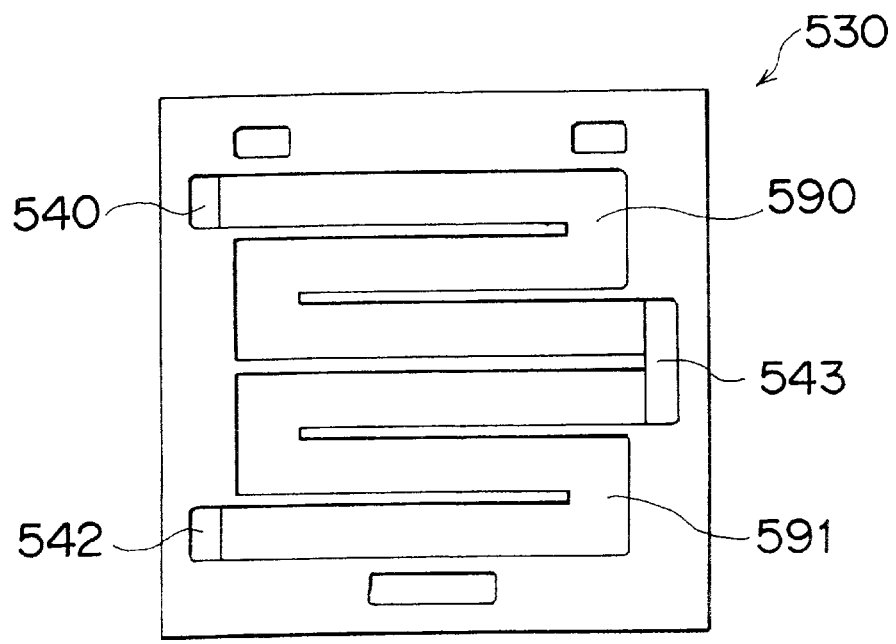

FIG. 12 is a plan view of a separator 530 in which a surface is divided into six horizontally extending regions. A recessed portion 590 extends in the upper three of the six divisions, in a serpentine manner with two turns. A recessed portion 591 extends in the lower three of the six divisions, in a serpentine manner with two turns. In a fuel cell incorporating separators 530, the recessed portions 590, 591 of each separator form in-cell oxidative gas passages. In the fuel cell, holes 540 of the separators 530 form an oxidative gas supply manifold, and holes 542 of the separators 530 form an oxidative gas discharge manifold, and holes 543 of the separators 530 form an oxidative gas transit manifold. The oxidative gas flows from the oxidative gas supply manifold into each unit cell, and then flows through the in-cell oxidative gas passage formed by the recessed portion 590. After temporarily flowing in the oxidative gas transit manifold, the oxidative gas flows into the in-cell oxidative gas passage formed by the recessed portion 591 of each separator 530. After that, the oxidative gas flows into the oxidative gas discharge manifold, whereby the oxidative gas is led out of the fuel cell. Although the separator 530 shown in FIG. 12 has only one hole 543 for forming an oxidative gas transit manifold, it is also possible to form two or more holes in a separator for forming a plurality of oxidative gas transit manifolds. For example, a turning portion of each of the recessed portions 590, 591 of a separator may be provided with a hole for forming an oxidative gas transit manifold.

By adopting a separator construction as described above in which a surface is divided into a plurality of regions, and recessed portions for forming in-cell gas passages are formed with reference to the divided regions, and the recessed portions are interconnected by one or more holes for forming one or more gas transit manifolds, it becomes possible to substantially equalize the gas flow rates in the gas passages of a fuel cell and therefore achieve substantially the same advantages as described above. Although the foregoing description is made regarding only the oxidative gas passages, that is, the surface of each of the separators that can be seen in FIGS. 10 through 12, it is also possible to form fuel gas passages having a similar construction on the opposite surface of a separator (the surface not shown in FIGS. 10 through 12). In this case, too, the gas flow rates in the gas passages can be substantially equalized, so that the fuel cell performance can be improved. The gas flow rate at a given point in each in-cell gas passage increases as the configuration of recessed portions formed in a separator surface becomes finer (e.g., more turns are provided in a serpentine configuration) so that the cross sectional area of the gas passage formed by the recessed portion decreases. An increase in the gas flow rate at a given point enhances the gas diffusion and therefore increases the gas utilization rate. Furthermore, as the gas flow rate in each in-cell gas passage increases so that the gas flow velocity increases, condensed water is more likely to be blown away, that is, less likely to reside in an in-cell gas passage, so that the water drainage from the in-cell gas passages improves. However, a reduction in the sectional passage area increases the pressure loss occurring when gas flows through an in-cell gas passage. An increase in the pressure loss involved in passage of gas increases the energy needed to pressurize the gas before it is supplied to a fuel cell. Thus, a reduction in the sectional passage area may lead to a reduction in the energy efficiency of the entire system incorporating the fuel cell. Therefore, a suitable configuration of the recessed portions may be determined, considering an increase in the gas utilization rate achieved by a finer configuration thereof, the effect of an increase in the pressure loss caused by a finer configuration thereof, the forming precision required in a separator forming process, and the like.

Each recessed portion formed in the opposite surfaces of each separator for forming an in-cell gas passage has a plurality of protrusions that diffuse the gas flowing through the passage and secure a sufficient electrical conductivity between the separator and the adjacent gas diffusion electrode, as describe above in conjunction with the separator 30 with reference to FIG. 4. However, if the configuration of a recessed portion is sufficiently fine (for example, if the recessed portion has sufficiently many turns) so that a sufficiently high gas diffusion and a sufficiently high electrical conductivity between the separator and the adjacent gas diffusion electrode can be achieved, it is not necessary to provide protrusions corresponding to the protrusions 94 in the recessed portion.

Figure 13:
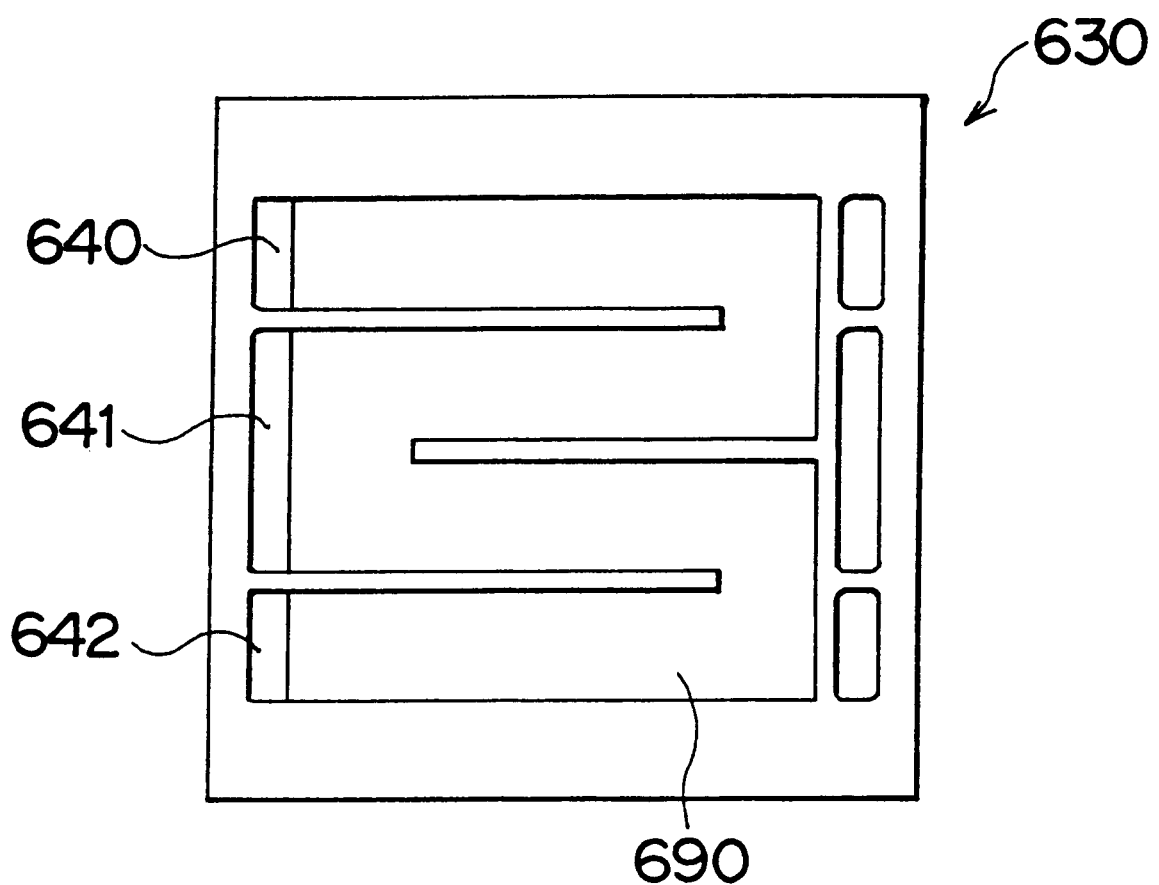

Although in the foregoing embodiments, the entire flow of a gas through the earlier-stage in-cell gas passages formed by recessed portions formed in a surface of each separator temporarily flows in a gas transit manifold, and then flows into the subsequent-stage in-cell gas passages, it is also possible to bypass a portion of the flow of the gas from each earlier-stage in-cell gas passage around the gas transit manifold. As an example of such a construction, FIG. 13 shows a separator 630 (the construction in a surface thereof where an oxidative gas passage is formed). The surface of the separator 630 is divided into four horizontally extending portions, which are connected to form a recessed portion 690. The separator 630 has holes 640, 641, 642. In a fuel cell incorporating separators 630, the oxidative gas flows from an oxidative gas supply manifold formed by the holes 640 of the separators 630 into each unit cell, and then flows in the oxidative gas passage formed by the recessed portion 690 of each separator 630. After that, the oxidative gas flows out into an oxidative gas discharge manifold formed by the holes 642 of the separators 630, and the oxidative gas is conveyed out of the fuel cell by the oxidative gas discharge passage.

The recessed portion 690 of each separator forming an oxidative gas passage communicates with the hole 641. The recessed portion 690 is not partitioned by the hole 641, but continuously extends from the hole 640 to the hole 642. As shown in FIG. 13, the hole 641 is formed along one side of the separator 630 so that it communicates with recessed portion 690. In this case, outside folded portion of the recessed portion 690 connects the hole 641, while inside folded portion of the recessed portion 690 is isolated from the hole 641. Therefore, a portion of the flow of the oxidative gas in the oxidative gas passage temporarily flows in the oxidative gas transit manifold formed by the holes 641, but the remainder flows through the in-cell gas passage to the oxidative gas discharge manifold, bypassing the oxidative gas transit manifold. FIG. 13 shows one side of the separator 630 where the oxidative gas passage is formed. However, the other side where a fuel gas passage is formed has same structure. Thus, a portion of the flow of a fuel gas supplied from the fuel gas supply manifold flows in a fuel gas transit manifold formed by a hole corresponding to the hole 641, but the remainder flows thorough the in-cell fuel gas passage formed by a recessed portion(corresponding to the recessed portion 690) to the gas transit manifold.

To form a folded portion, where the direction of gas flow is turned, in a gas separator, may increase pressure loss and cause an irregular gas flow in a gas passage, because of the narrowness of the passage at the folded portion. Accordingly, it is preferable to make the gas passage wider at the folded portion to prevent this problem. In a separator where a recessed portion is partitioned by a hole, it is necessary to enlarge the hole in order to form a wider passage at the folded portion. In such structure, however, the area occupied area by holes in the separator may be increased, thereby reducing the effective area for electrochemical reaction. However, the separator 630 maintains sufficient width of the passage at the folded portion, preventing an increase of pressure loss in the gas passage without enlargement of the hole, as the recessed ortion extends continuously on the inward side of the folded portion.

Figure 14A:
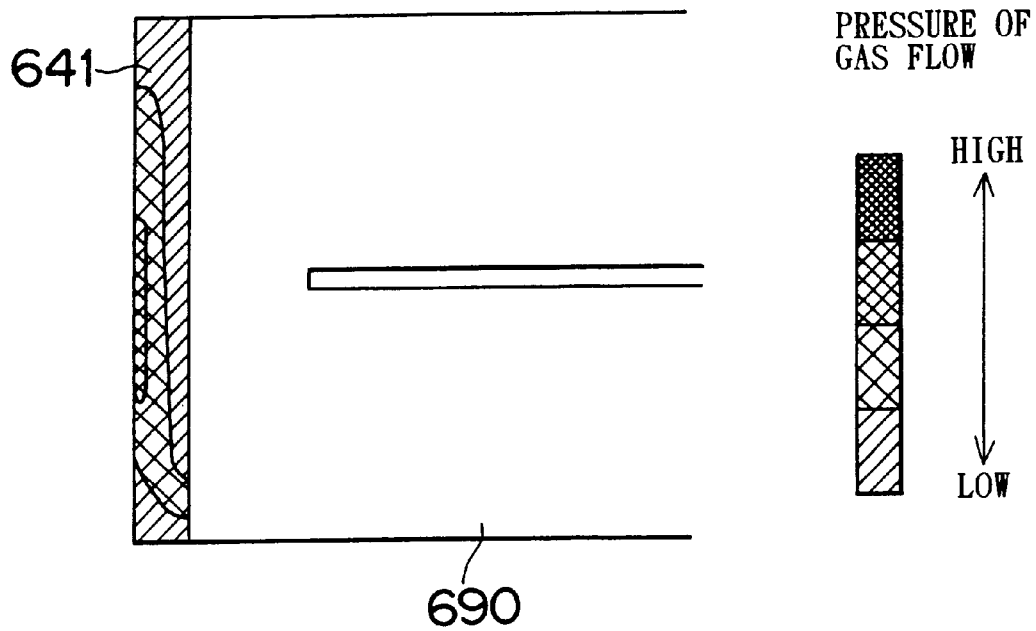
FIGS. 14A and 14B illustrate simulated gas flow in a gas transit manifold according to the present invention.
Figure 14B:
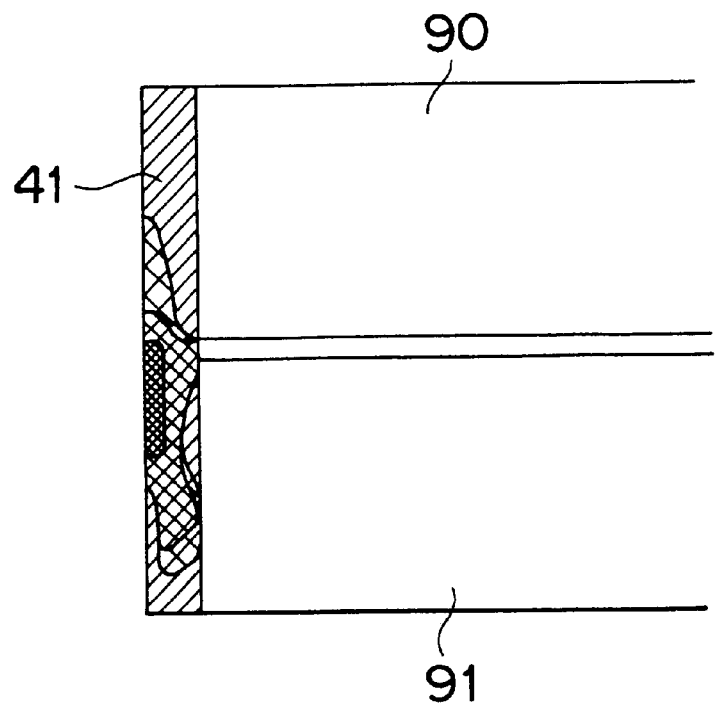

FIGS. 14A and 14B show simulated gas flow in the separator 30 and the separator 630, respectively. In each drawing, pressure distribution in the gas transit manifold is simulated. As shown in FIG. 14B, in the gas separator in which the recessed portion is partitioned by the hole, pressure at the gas transit manifold formed by the hole is higher than that in a corresponding portion in of the separator shown in FIG. 14A. The simulations indicate that high pressure loss occurs in the separator 630. On the contrary, as shown in FIG. 14A, in the gas separator having the recessed portion in which gas flows bypassing the transit manifold, the pressure in the gas transit manifold is reduced. Thus pressure loss caused by gas passing in the in-cell gas passage is reduced.

In the gas separator 30, there is an excessive high pressure region at the particular portion in the transit manifold shown in FIG. 14B. This may cause much pressure loss and may make it difficult to maintain uniform gas flow. In the separator 30, flow velocity and turbulent gas flow occur at a downstream side of the gas transit manifold. As a result, the uniform efficiency of electrochemical reaction in the fuel cell is not obtainable. On the contrary, the separator shown in FIG. 14A prevents such turbulent gas flow and maintains sufficient efficiency of electrochemical reaction in every portion of the fuel cell.

Moreover, the structure of the separator 630 has the advantage of making the fuel cell more compact. That is, due to the above mentioned structure, excessive pressure loss and turbulent gas flow do not occur even if the holes which form gas transit manifold are made smaller.

The holes forming the gas transit manifolds are formed along the side portion of the separator. However, it is preferable to vary the distance between the separator edge and the hole edge as shown in FIGS. 15A and 15B.

Figure 15A:
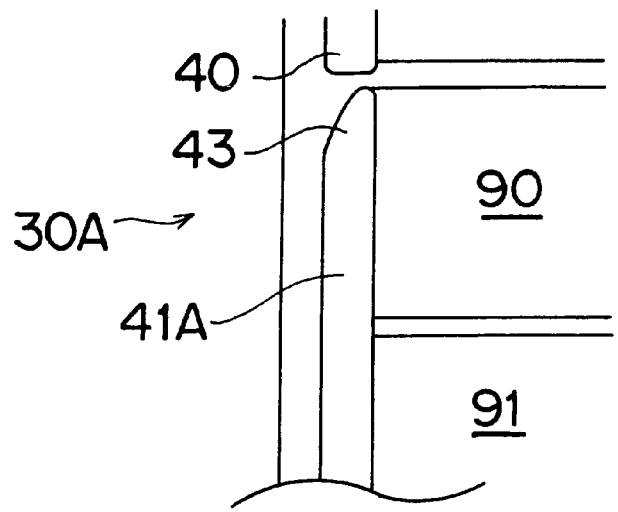
FIGS. 15A and 15B illustrate holes which form gas transit manifolds according to the present invention.
Figure 15B:
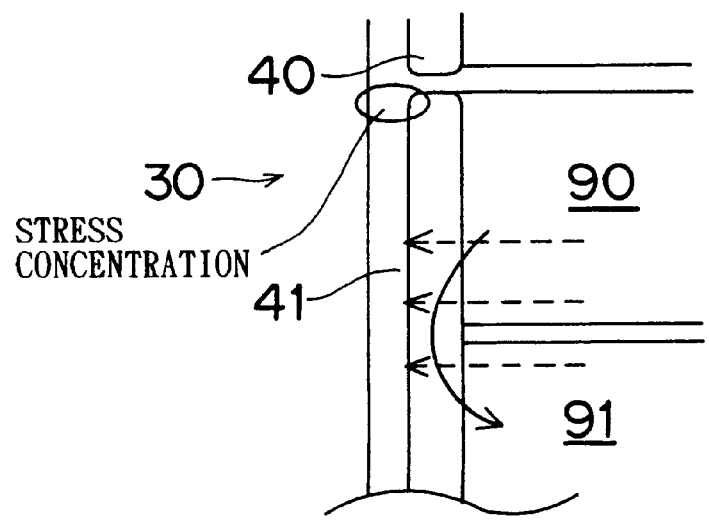

FIGS. 15A and 15B show plain views of separators, especially around the end portions of holes forming gas transit manifolds. A separator 30A shown in FIG. 15A has a hole 41A with a varying amount of space between the edge of the separator and the hole 41A. FIG. 15B shows the aforementioned separator 30 having a hole 40 with a constant amount of space between the edge and the hole 40. As shown in FIG. 15A, an end portion of the hole 41A curves inward so that the hole 41A narrows gradually.

As indicated by the arrow in FIG. 15B, gas passing in the in-cell passage reverse its flow direction at the folding portion, and therefore, stress (indicated by dashed arrows) occurs at the hole, especially around the corner edge portion of the hole (circled portion in FIG. 15B). In point of view of the strength and durability against the stress, it is preferable to form holes away from the edge of the separator, tending to increase the size of the separator. The separator 30A having the hole 41A, however, maintains sufficient strength and durability with no increase in separator size.

Moreover, the side shape of the hole 41A allows gas passing through the in-cell passage to flow smoothly along the graded curved corner of the hole 41A. Those skilled in the art will recognize that it is also possible to form the other side of the hole 41A, which is not shown in FIG. 15A, with a curve as similar or identical to the above described shape.

Since a portion of the flow of gas in each in-cell gas passage formed by the recessed portion 690 of each separator 630 temporarily flows in the gas transit manifold, in partway of the in-cell gas passage, a fuel cell incorporating separators 630 substantially equalizes the gas flow rates in the unit cells of the fuel cell, thereby enhancing the fuel cell performance. This separator construction is particularly useful in a case where the holes for forming gas manifolds need to be reduced in size in order to reduce the size of the fuel cell, but a reduction of the size of the holes has the danger of excessively increasing the pressure loss involved in passage of gas or impeding the gas flow. Since the separator construction as shown in FIG. 13 allows a portion of the flow of the gas in each in-cell gas passage formed by the recessed portion 690 to flow in the gas transit manifold in partway of the in-cell gas passage, the rates of gas flow through the in-cell gas passages can be substantially equalized. At the same time, since the remainder of the gas flow bypasses the gas transit manifold, a sufficiently high gas flow rate can be reliably provided.

Although in the foregoing embodiments, the holes that form transit manifolds are formed at turns of each recessed portion that forms an in-cell gas passage, that is, near the outer periphery of each separator, a hole that forms a gas transit manifold may be formed in a different region of each separator. This separator construction still achieves the advantage of substantially equalizing the gas flow velocities in the gas passages. As examples of the separator construction, a separator 730 and a separator 830 are shown in FIGS. 16 and 17.

Figure 16:
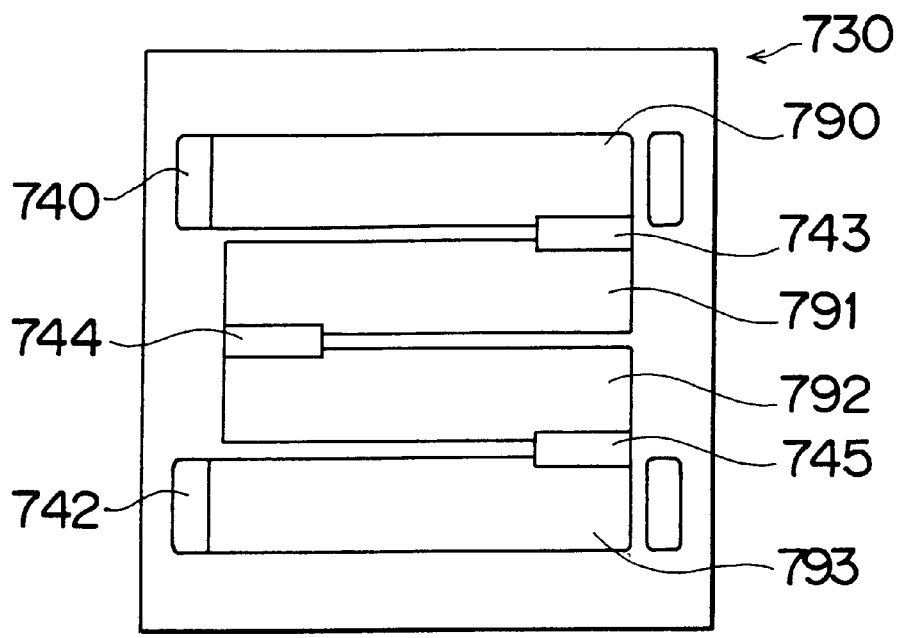
FIG. 16 is a plan view of a separator.

FIG. 16 is a plan view of the separator 730 (the construction of a surface thereof where an oxidative gas passage is formed). The surface of the separator 730 is divided into four horizontally extending regions where recessed portions 790, 791, 792, 793 are formed respectively. In a fuel cell incorporating separators 730, the recessed portions 790, 791, 792, 793 of the separators 730 are serially connected in communication in that order, and form in-cell gas passages. Holes 740 of the separators 730 form an oxidative gas supply manifold, and holes 742 of the separators 730 form an oxidative gas discharge manifold, and holes 743, 744, 745 of the separators 730 form oxidative gas transit manifolds.

The hole 743 of each separator 703 connects the recessed portion 790 and the recessed portion 791. The hole 744 connects the recessed portions 791, 792. The hole 745 connects the recessed portions 792, 793. Unlike the holes that form gas transit manifolds in the foregoing embodiments, the holes 743, 744, 745 are formed relatively toward the center of each separator 730. More specifically, the holes 743, 744, 745 are not formed immediately outwardly of turns of the serpentine-shape recessed portions formed in the surface of each separator, but formed at such positions as to connect adjacent recessed portions at their adjacent side portions (see FIG. 16).

Figure 17:
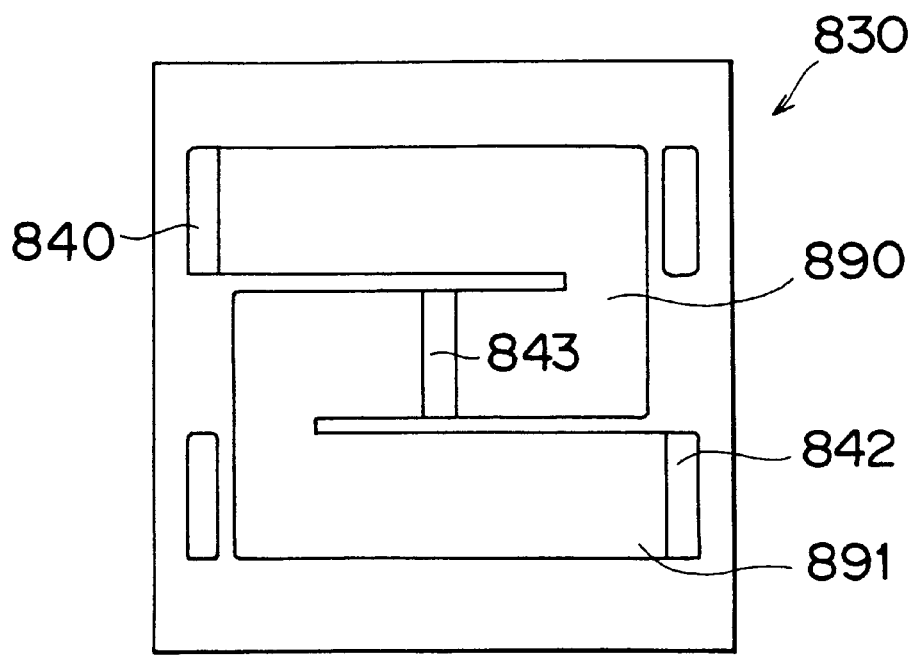
FIG. 17 is a plan view of a separator.
Figure 18:
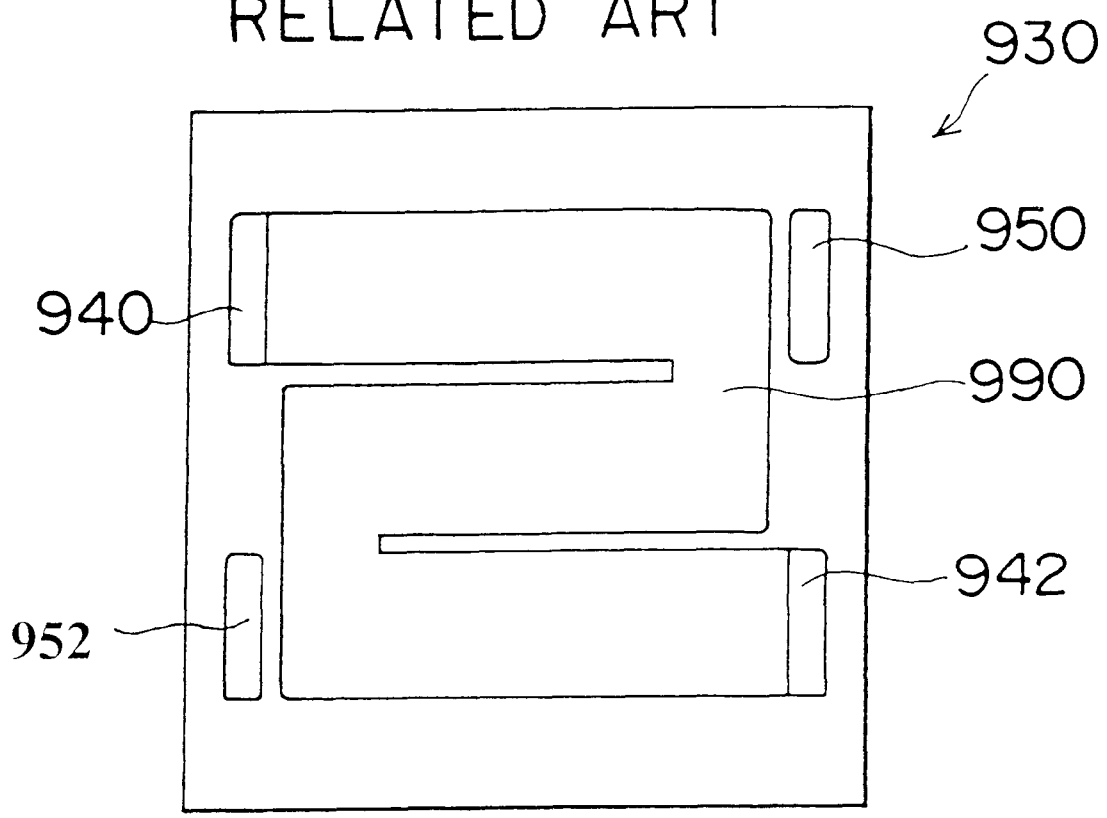
FIG. 18 is a plan view of a related-art separator.

FIG. 17 is a plan view of the separator 830 (the construction of a surface thereof where an oxidative gas passage is formed). The surface of the separator 830 is divided into three horizontally extending regions. A recessed portion 890 extends throughout the top region, and turns into the intermediate region, and continuously extends to a substantially middle portion of the intermediate region. A recessed portion 891 extends from the substantially middle portion of the intermediate region and continuously extends throughout the bottom region. Formed in the substantially middle portion of the intermediately region is a hole 843 for connecting the recessed portions 890, 891 in communication (see FIG. 17). In a fuel cell incorporating separators 830, the recessed portions 890, 891 of the separators 830 are connected in communication in that order, and form in-cell gas passages. Holes 840 of the separators 830 form an oxidative gas supply manifold, and holes 842 of the separators 830 form an oxidative gas discharge manifold, and the holes 843 of the separators 830 form an oxidative gas transit manifold.

Although in the separators 730, 830 shown in FIGS. 16 and 17, the gas transit manifold construction is provided only for the oxidative gas, it is also possible to provide a similar gas transit manifold construction for the fuel gas.

The hole that forms a gas transit manifold may be formed in any region in a separator. If the gas transit manifold formed by the holes of separators communicates with the in-cell gas passages formed by the recessed portions formed in each separator so that the gas can temporarily flows in the gas transit manifold when flowing in each unit cell, it is possible to substantially equalize the gas flow rates in the gas passages in the fuel cell. Therefore, various designs, including the number of divisions of a surface of a separator, the number of transit manifolds, the position of a hole in each separator for forming a transit manifold, and the like, can be freely determined, considering the energy efficiency of the entire system incorporating a fuel cell, restrictions related to an installation space for the fuel cell, and the like.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements without departing from the spirit of the invention.

What is claimed is:

1. A separator for use in a fuel cell formed by a stacked plurality of unit cells, comprising:

first, second and third holes extending through a thickness of the separator; and a gas passage recessed into a surface of the separator, the gas passage extending along the surface of the separator from the first hole to the second hole, via the third hole.

2. A separator according to claim 1, wherein the gas passage includes a plurality of protrusions protruding thereinto in a thickness direction of the separator.

3. A separator according to claim 2, wherein the protrusions have a generally rectangular sectional shape.

4. A separator according to claim 2, wherein the protrusions form a rib structure.

5. A separator according to claim 1, wherein the gas passage has a folding portion formed therein and wherein the third hole intersects at least a part of the folding portion.

6. A separator according to claim 1, wherein the gas passage has a folding portion formed therein near an edge of the unit cell, and wherein the third hole intersects at least an outside part of the folding portion, a space between an end portion of the transit manifold and the edge of the unit cell being wider than a space between a central portion of the transit manifold and the edge of the unit cell.

* * * * *